US007558407B2

(12) United States Patent
Hoffman et al.

(10) Patent No.: US 7,558,407 B2
(45) Date of Patent: *Jul. 7, 2009

(54) TOKENLESS ELECTRONIC TRANSACTION SYSTEM

(75) Inventors: Ned Hoffman, Sebastopol, CA (US); David Ferrin Pare, Jr., Berkeley, CA (US); Jonathan Alexander Lee, Oakland, CA (US)

(73) Assignee: YT Acquisition Corporation, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/763,334

(22) Filed: Jun. 14, 2007

(65) Prior Publication Data

US 2007/0291996 A1 Dec. 20, 2007

Related U.S. Application Data

(60) Continuation of application No. 11/245,624, filed on Oct. 7, 2005, now Pat. No. 7,248,719, which is a continuation of application No. 10/619,990, filed on Jul. 14, 2003, now Pat. No. 6,985,608, which is a division of application No. 10/114,587, filed on Apr. 1, 2002, now Pat. No. 6,594,376, which is a division of application No. 09/183,215, filed on Oct. 30, 1998, now Pat. No. 6,366,682, which is a continuation of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345,523, filed on Nov. 28, 1994, now Pat. No. 5,615,277.

(51) Int. Cl.
*G06K 9/00* (2006.01)
*G06K 5/00* (2006.01)

(52) U.S. Cl. .................. 382/115; 382/139; 235/380

(58) Field of Classification Search .............. 382/112, 382/113, 114, 115, 116, 117, 118, 119, 124, 382/156, 168, 181, 182, 202, 186–188, 220, 382/232, 274, 290, 305, 314, 135–139; 235/379, 235/380; 340/5.2, 5.82; 704/246; 902/3

See application file for complete search history.

(56) References Cited

U.S. PATENT DOCUMENTS 3,639,905 A * 2/1972 Yaida et al. ............... 340/5.82

(Continued)

FOREIGN PATENT DOCUMENTS

EP 0 581 421 A1 2/1994

(Continued)

OTHER PUBLICATIONS

Holmes, et al., "A Performance Evaluation of Biometric Identification Devices"; Sandia National Laboratories; Albuquerque, NM; Jun. 1991.

(Continued)

*Primary Examiner*—Seyed Azarian
(74) *Attorney, Agent, or Firm*—Marger Johnson & McCollom PC

(57) ABSTRACT

The invention as described provides a method and system for tokenless authorization of commercial transactions between a buyer and a seller using a computer system. The method comprises the steps of registering a buyer, wherein the buyer registers with the computer system a PIN, at least one registration biometric sample, and at least one buyer financial account. The method also includes a seller registration step, wherein the seller registers with the computer system at least one seller financial account. In a proposal step, the seller offers a proposed commercial transaction to the buyer usually comprising price information. If the buyer accepts the seller's proposal, in an acceptance step, the buyer signals his/her acceptance by adding to the proposed commercial transaction the buyer's personal authentication information comprising a PIN and at least one bid biometric sample which is obtained from the buyer's person. In a transmission step, the bid biometric sample and PIN are forwarded to the computer system. The computer system compares the bid biometric sample with registration biometric samples for producing either a successful or failed identification of the buyer in a buyer identification step. Upon determination of sufficient resources, a financial account of the buyer is debited and a financial account of the seller is credited, in a payment step. Therefore, a commercial transaction is conducted without the buyer having to use any portable man-made memory devices such as smartcards or swipe cards.

16 Claims, 15 Drawing Sheets

U.S. PATENT DOCUMENTS

| | | |
|---|---|---|
| 3,876,864 A | 4/1975 | Clark et al. |
| 3,943,335 A | 3/1976 | Kinker et al. |
| 3,975,711 A | 8/1976 | McMahon |
| 4,048,618 A | 9/1977 | Hendry |
| 4,151,512 A | 4/1979 | Riganati et al. |
| 4,208,651 A | 6/1980 | McMahon |
| 4,213,038 A | 7/1980 | Silverman et al. |
| 4,227,805 A | 10/1980 | Schiller |
| 4,253,086 A | 2/1981 | Szwarcbier |
| 4,321,672 A | 3/1982 | Braun |
| 4,322,163 A | 3/1982 | Schiller |
| 4,353,056 A | 10/1982 | Tsikos |
| 4,358,677 A | 11/1982 | Ruell et al. |
| 4,390,968 A | 6/1983 | Hennessy |
| 4,429,413 A | 1/1984 | Edwards |
| 4,484,328 A | 11/1984 | Schlafly |
| 4,537,484 A | 8/1985 | Fowler et al. |
| 4,544,267 A | 10/1985 | Schiller |
| 4,582,985 A | 4/1986 | Lofberg |
| 4,618,988 A | 10/1986 | Schiller |
| 4,649,563 A | 3/1987 | Riskin |
| 4,675,815 A | 6/1987 | Kuroki |
| 4,696,046 A | 9/1987 | Schiller |
| 4,699,149 A | 10/1987 | Rice |
| 4,720,869 A | 1/1988 | Wadia |
| 4,728,186 A | 3/1988 | Eguchi et al. |
| 4,734,858 A | 3/1988 | Schlafly |
| 4,747,050 A | 5/1988 | Brachtl et al. |
| 4,752,966 A | 6/1988 | Schiller |
| D298,536 S | 11/1988 | Brefka |
| 4,784,484 A | 11/1988 | Jensen |
| 4,799,156 A | 1/1989 | Shavit et al. |
| 4,805,223 A | 2/1989 | Denyer |
| 4,821,118 A | 4/1989 | Lafreniere |
| 4,837,422 A * | 6/1989 | Dethloff et al. ............. 235/380 |
| 4,845,636 A | 7/1989 | Walker |
| 4,868,376 A | 9/1989 | Lessin et al. |
| 4,926,480 A | 5/1990 | Chaum |
| 4,946,276 A | 8/1990 | Chilcott |
| 4,947,028 A | 8/1990 | Gorog |
| 4,947,443 A | 8/1990 | Costello |
| 4,961,142 A | 10/1990 | Elliott et al. |
| 4,993,068 A | 2/1991 | Piosenka et al. |
| 4,995,086 A | 2/1991 | Lilley et al. |
| 4,998,279 A | 3/1991 | Weiss |
| 5,025,372 A | 6/1991 | Burton |
| 5,036,461 A | 7/1991 | Elliot et al. |
| 5,054,089 A | 10/1991 | Uchida et al. |
| 5,054,090 A | 10/1991 | Knight et al. |
| 5,056,019 A | 10/1991 | Schultz et al. |
| 5,073,950 A | 12/1991 | Colbert et al. |
| 5,077,803 A | 12/1991 | Kato et al. |
| 5,088,817 A | 2/1992 | Igaki et al. |
| 5,095,194 A | 3/1992 | Barbanell |
| 5,103,486 A | 4/1992 | Grippi |
| 5,105,467 A | 4/1992 | Kim et al. |
| 5,109,427 A | 4/1992 | Yang |
| 5,109,428 A | 4/1992 | Igaki et al. |
| 5,144,680 A | 9/1992 | Kobayashi |
| 5,146,102 A | 9/1992 | Higuchi et al. |
| 5,161,204 A | 11/1992 | Hutcheson et al. |
| 5,168,520 A | 12/1992 | Weiss |
| 5,180,901 A | 1/1993 | Hiramatsu |
| 5,191,611 A | 3/1993 | Lang |
| 5,210,588 A | 5/1993 | Lee |
| 5,210,797 A | 5/1993 | Usui et al. |
| 5,222,152 A | 6/1993 | Fishbine et al. |
| 5,224,164 A | 6/1993 | Elsner et al. |
| 5,224,173 A | 6/1993 | Kuhns et al. |
| 5,229,764 A | 7/1993 | Matchett et al. |
| 5,230,025 A | 7/1993 | Fishbine |
| 5,239,583 A | 8/1993 | Parrillo |
| 5,241,606 A | 8/1993 | Horie |
| 5,251,259 A | 10/1993 | Mosley |
| D340,919 S | 11/1993 | Lee |
| 5,265,162 A | 11/1993 | Bush et al. |
| 5,267,324 A | 11/1993 | Kumagai |
| 5,274,695 A | 12/1993 | Green |
| 5,276,314 A | 1/1994 | Martino et al. |
| 5,280,527 A | 1/1994 | Gullman et al. |
| 5,280,627 A | 1/1994 | Flaherty et al. |
| 5,321,242 A | 6/1994 | Heath, Jr. |
| 5,321,765 A | 6/1994 | Costello |
| 5,325,442 A | 6/1994 | Knapp |
| 5,329,589 A | 7/1994 | Fraser et al. |
| 5,335,288 A | 8/1994 | Faulkner |
| 5,343,529 A | 8/1994 | Goldfine et al. |
| 5,351,303 A * | 9/1994 | Willmore ..................... 382/115 |
| 5,354,974 A | 10/1994 | Eisenberg |
| 5,359,669 A | 10/1994 | Shanley et al. |
| 5,371,794 A | 12/1994 | Diffie et al. |
| 5,371,797 A | 12/1994 | Bocinsly, Jr. |
| 5,383,113 A | 1/1995 | Kight et al. |
| 5,386,104 A | 1/1995 | Sime |
| 5,400,662 A | 3/1995 | Tamori |
| 5,412,738 A | 5/1995 | Brunelli et al. |
| 5,416,573 A | 5/1995 | Sartor, Jr. |
| 5,429,006 A | 7/1995 | Tamori |
| 5,457,747 A | 10/1995 | Drexler |
| 5,465,290 A | 11/1995 | Hampton et al. |
| 5,465,303 A | 11/1995 | Levison et al. |
| 5,469,506 A | 11/1995 | Berson et al. |
| 5,484,988 A | 1/1996 | Hills et al. |
| 5,485,510 A | 1/1996 | Colbert |
| D367,044 S | 2/1996 | Arakaki |
| 5,493,621 A | 2/1996 | Matsumura |
| 5,499,288 A | 3/1996 | Hunt et al. |
| 5,513,272 A | 4/1996 | Bogosian, Jr. |
| 5,517,558 A | 5/1996 | Schalk |
| 5,533,123 A | 7/1996 | Force et al. |
| 5,534,855 A | 7/1996 | Shockley et al. |
| 5,546,471 A * | 8/1996 | Merjanian ..................... 382/124 |
| 5,546,523 A | 8/1996 | Gatto |
| 5,561,718 A | 10/1996 | Trew et al. |
| 5,572,597 A | 11/1996 | Chang et al. |
| 5,577,120 A | 11/1996 | Penzias |
| 5,598,474 A | 1/1997 | Johnson |
| 5,602,933 A | 2/1997 | Blackwell et al. |
| 5,604,802 A | 2/1997 | Holloway |
| 5,613,012 A | 3/1997 | Hoffman et al. |
| 5,615,277 A * | 3/1997 | Hoffman ..................... 382/115 |
| 5,621,812 A | 4/1997 | Deaton et al. |
| 5,635,723 A | 6/1997 | Fujieda et al. |
| 5,636,038 A | 6/1997 | Lynt et al. |
| 5,636,282 A | 6/1997 | Holmquist |
| 5,647,364 A | 7/1997 | Schneider et al. |
| 5,650,217 A | 7/1997 | Skrivanek et al. |
| 5,655,116 A | 8/1997 | Kirk et al. |
| 5,677,989 A | 10/1997 | Rabin et al. |
| 5,719,950 A | 2/1998 | Osten et al. |
| 5,745,555 A | 4/1998 | Mark |
| 5,748,780 A | 5/1998 | Stolfo |
| 5,757,917 A | 5/1998 | Rose et al. |
| 5,764,789 A | 6/1998 | Pare, Jr. et al. |
| 5,768,134 A | 6/1998 | Swaelens et al. |
| 5,770,849 A | 6/1998 | Novis et al. |
| 5,787,187 A | 7/1998 | Bouchard et al. |
| 5,790,668 A | 8/1998 | Tomko |
| 5,794,207 A | 8/1998 | Walker et al. |
| 5,796,857 A | 8/1998 | Hara |
| D397,682 S | 9/1998 | Yotukura |
| 5,802,199 A | 9/1998 | Pare, Jr. et al. |
| 5,805,719 A | 9/1998 | Pare, Jr. et al. |
| D400,191 S | 10/1998 | Butts et al. |

| | | |
|---|---|---|
| 5,822,737 A | 10/1998 | Ogram |
| 5,825,907 A | 10/1998 | Russo |
| 5,825,924 A | 10/1998 | Kobayashi |
| 5,826,241 A | 10/1998 | Stein et al. |
| 5,826,245 A | 10/1998 | Sandberg-Diment |
| 5,832,464 A | 11/1998 | Houvener et al. |
| 5,838,812 A | 11/1998 | Pare, Jr. et al. |
| 5,844,287 A | 12/1998 | Hassan et al. |
| 5,845,005 A | 12/1998 | Setlak et al. |
| 5,848,400 A | 12/1998 | Chang |
| 5,850,442 A | 12/1998 | Muftic |
| 5,870,723 A | 2/1999 | Pare, Jr. et al. |
| 5,876,926 A | 3/1999 | Beecham |
| 5,892,824 A | 4/1999 | Beatson et al. |
| 5,892,838 A | 4/1999 | Brady |
| 5,910,988 A | 6/1999 | Ballard |
| 5,926,555 A | 7/1999 | Ort et al. |
| 5,930,804 A | 7/1999 | Yu et al. |
| 5,933,515 A | 8/1999 | Pu et al. |
| 5,935,071 A | 8/1999 | Schneider et al. |
| 5,943,235 A | 8/1999 | Earl et al. |
| 5,943,423 A | 8/1999 | Muftic |
| 5,956,700 A | 9/1999 | Landry |
| 5,982,914 A | 11/1999 | Lee et al. |
| 5,986,746 A | 11/1999 | Metz et al. |
| 5,991,372 A | 11/1999 | Davenport D'Ingianni et al. |
| 6,011,858 A | 1/2000 | Stock et al. |
| 6,012,039 A | 1/2000 | Hoffman et al. |
| 6,016,476 A | 1/2000 | Maes et al. |
| 6,023,688 A | 2/2000 | Ramachandran et al. |
| 6,028,950 A | 2/2000 | Merjanian |
| 6,029,195 A | 2/2000 | Herz |
| 6,040,783 A | 3/2000 | Houvener et al. |
| 6,041,309 A | 3/2000 | Laor et al. |
| 6,045,039 A | 4/2000 | Stinson et al. |
| 6,052,675 A | 4/2000 | Checchio |
| 6,064,751 A * | 5/2000 | Smithies et al. ............ 382/115 |
| 6,070,141 A | 5/2000 | Houvener et al. |
| 6,072,894 A | 6/2000 | Payne |
| 6,073,840 A | 6/2000 | Marion |
| 6,084,967 A | 7/2000 | Kennedy et al. |
| 6,105,010 A | 8/2000 | Musgrave |
| 6,111,977 A | 8/2000 | Scott et al. |
| 6,119,096 A | 9/2000 | Mann et al. |
| 6,154,727 A | 11/2000 | Karp et al. |
| 6,154,879 A | 11/2000 | Pare, Jr. et al. |
| 6,182,076 B1 | 1/2001 | Yu et al. |
| 6,192,142 B1 | 2/2001 | Pare, Jr. et al. |
| 6,202,151 B1 | 3/2001 | Musgrave et al. |
| 6,208,746 B1 | 3/2001 | Musgrave |
| 6,219,439 B1 | 4/2001 | Burger |
| 6,230,148 B1 | 5/2001 | Pare, Jr. et al. |
| 6,233,565 B1 | 5/2001 | Lewis et al. |
| 6,233,618 B1 | 5/2001 | Shannon |
| 6,256,737 B1 | 7/2001 | Bianco et al. |
| 6,260,024 B1 | 7/2001 | Shkedy |
| 6,268,788 B1 | 7/2001 | Gray |
| 6,269,348 B1 | 7/2001 | Pare, Jr. et al. |
| 6,275,944 B1 | 8/2001 | Kao et al. |
| 6,310,966 B1 | 10/2001 | Dulude et al. |
| 6,311,272 B1 | 10/2001 | Gressel |
| 6,327,578 B1 | 12/2001 | Linehan |
| 6,366,682 B1 | 4/2002 | Hoffman et al. |
| 6,377,228 B1 | 4/2002 | Jenkin et al. |
| 6,397,198 B1 | 5/2002 | Hoffman et al. |
| 6,411,728 B1 | 6/2002 | Lee et al. |
| 6,496,107 B1 | 12/2002 | Himmelstein et al. |
| 6,522,772 B1 | 2/2003 | Morrison et al. |
| 7,133,792 B2 | 11/2006 | Murakami et al. |
| 7,152,787 B2 | 12/2006 | Cheng |
| 2001/0000045 A1 | 3/2001 | Yu et al. |
| 2001/0000535 A1 | 4/2001 | Lapsley et al. |
| 2001/0011247 A1 | 8/2001 | O'Flaherty et al. |
| 2001/0033661 A1 | 10/2001 | Prokoski |
| 2001/0034837 A1 | 10/2001 | Kausik et al. |
| 2001/0044775 A1 | 11/2001 | Saito et al. |
| 2003/0061172 A1 | 3/2003 | Robinson |

FOREIGN PATENT DOCUMENTS

| | | | |
|---|---|---|---|
| EP | 0 598 469 | A2 | 5/1994 |
| EP | 0 651 357 | A1 | 5/1995 |
| EP | 0 823 701 | A2 | 2/1998 |
| EP | 0 652 540 | B1 | 9/2000 |
| GB | 0 598 469 | A2 * | 4/1993 |
| JP | S57-212851 | | 12/1982 |
| JP | S59-36860 | | 2/1984 |
| JP | 61-187838 | | 8/1986 |
| JP | S63-003369 | | 1/1988 |
| JP | 63-120385 | | 5/1988 |
| JP | 63-261492 | | 10/1988 |
| JP | 03-189756 | | 8/1991 |
| JP | 03-288954 | | 12/1991 |
| JP | 04-322382 | | 11/1992 |
| JP | 04-324583 | | 11/1992 |
| JP | 05-62057 | | 3/1993 |
| JP | 05-250524 | | 9/1993 |
| JP | 06-149980 | | 5/1994 |
| JP | 06-176135 | | 6/1994 |
| WO | WO94/10659 | | 5/1994 |
| WO | WO95/13591 | | 5/1995 |
| WO | WO98/25227 | | 6/1997 |
| WO | WO98/50875 | | 11/1998 |
| WO | WO99/28847 | | 6/1999 |

OTHER PUBLICATIONS

Anderson, T.; "Security Management"; v. 37, No. 11; Nov. 1993; pp. 17-19.

Lange, et al.; "Digital Identification: It's Now at our Fingertips", *Electronic Engineering Times*; No. 946; Mar. 24, 1997; p. 142.

Radcliff; "When Data Warehouse Become Open House"; *Software Management*; v. 16, No. 11; Nov. 26, 1996.

Anonymous; A Credit Union Points a Finger at Biometrics; *Bank Network News*; v. 15, No. 16; Jan. 13, 1997.

Hall, J; "Scanning Lets Fingerprints Do Talking"; *Toronto Star*; PA6, May 15, 1997.

Scally, R.; "CompUSA Tests Fingerprints to Help Secure Transactions"; *Discount Store News*; v. 36, No. 10, May 19, 1997.

Stosz, et al. "Automated System for Fingerprint Authentication Using Pores and Ridge Structure"; *Proceedings of The International Society for Optical Engineering*; v. 2277; Jul. 28-29, 1994; pp. 210-223.

Recently Granted Patents in the USA—Sep. 1998; Transponder News; (5 pages).

Toll, Janie "Veridicom Showcases New Customers and Applications at COMDEX"; Press Release; Nov. 16, 1998; 3 pages.

Kolor, Joanna; "Biometric Technology Goes Live" *Bank Network News*; May 1, 1996; 7 pages.

State of Virginia, Department of Social Services, "What Are Food Stamps", 2005 (1 page).

Rechtin, "Fingerprint Technology for Best ID System", Orange County Business Journal, 1999 (1 page).

"Biometric ID Cards", story from Totse.com, Feb. 1996.

"Biometric payment firm Pay By touch secures $10 million funding", story from Finextra.com, Oct. 2003.

"Biometric Comparison Chart", ncsc.dni.us, 2002.

"Is it Time for Biometrics?", Banking Automation Bulletin for Europe, London, Sep. 1992, Issue 115, p. 1 (ProQuest document ID 7415352).

"Pay By Touch announces first UK Customer", May 2004.

"Supermarkets and Shopper Registration Guide", from Nocards.org. (2007).

"TCP Protocol Overview", www.freesoft.org/CIE/Topics/83.htm, 3 pages. (2007).

"Why do you call them 'registration and monitoring' programs?", questio from CASPIAN, Nocards.org. (2007).

Covoukian, Ann, "Consumer Biometric Applications: A Discussion Paper", Information and Privacy Commissioner, Ontario, Canada, Sep. 1999.

Cavoukian, Ann, Ph. D., "Building in Privacy", May 14-16, 1996. http://www.cpsr.org/cpsr/lists/rre/building_in_privacy. Online 2004.

Kolor, Joanna, "Biometric Technology Goes Live," Bank Technology News, May 1996.

Rechtin, Mark, "Fingerprint Technology Makes for Best ID System," Orange County Business Journal, Newport Beach, May 14, 1990, vol. 12, Issue 51, Sec. 1, p. 7 (Proquest document ID 6020297).

State of Virginia, Department of Social Services, "What are food stamps?" http://www.dss.virginia.gov/benefit/foodstamps.html, downloaded Nov. 10, 2005.

* cited by examiner

TOKENLESS ELECTRONIC TRANSACTION SYSTEM

This application is a continuation of application U.S. Ser. No. 11/245,624, filed Oct. 7, 2005, now U.S. Pat. No. 7,248, 719, which is a continuation of application U.S. Ser. No. 10/619,990, filed Jul. 14, 2003, now U.S. Pat. No. 6,985,608, which is a division of application U.S. Ser. No. 10/114,587, filed Apr. 1, 2002, now U.S. Pat. No. 6,594,376, which is a division of application U.S. Ser. No. 09/183,215, filed Oct. 30, 1998, now U.S. Pat. No. 6,366,682, which is a continuation of application U.S. Ser. No. 08/705,399, filed Aug. 29, 1996, now U.S. Pat. No. 5,870,723, which is a continuation-in-part of application U.S. Ser. No. 08/442,895, filed on May 17, 1995, now U.S. Pat. No. 5,613,012, which is a continuation-in-part of application U.S. Ser. No. 08/345,523, filed on Nov. 28, 1994, now U.S. Pat. No. 5,615,277, all herein incorporated by reference.

BACKGROUND OF THE INVENTION

The use of a token, an inanimate object which confers a capability to the buyer presenting it, is pervasive in today's financial world. Whether a consumer is buying groceries with a debit card or shopping in a department store with a credit card, at the heart of that transaction is a money transfer enabled by a token, which acts to identify both the consumer as well as the financial account being accessed.

From their inception in the late 1950s, token-based financial transactions have grown increasingly more prevalent at the point of sale. However, as token-based transfers have become more popular with consumers, they have also become more popular with criminals intent on fraud. Currently, fraud losses in the industry stem from many different areas, but they are mainly due to either lost, stolen, or counterfeit cards.

Credit cards operate without the use of a personal identification number (PIN). This means that a lost credit card can easily be turned into cash if the card falls into the wrong hands. While theft of a token constitutes the majority of fraud in the system, fraud from counterfeit credit cards is rising rapidly. Counterfeit credit cards are manufactured by a more technically sophisticated criminal who acquires a cardholder's valid account number, produces a valid-looking counterfeit card, encodes the magnetic strip, and embosses the counterfeit plastic card with the account number. The card is then repeatedly presented to merchants until the account's credit limit is reached. Another form of loss is caused by a criminal seller or his employees who surreptitiously obtains the cardholder's account number and enter fictitious transactions against the card and then take cash out of the till. It is estimated that losses due to all types of fraud exceeds one billion dollars annually.

Generally, debit cards are used in conjunction with a personal identification number (PIN). Lost debit cards do not generally result in fraud, unless the owner of the card wrote his PIN on the card. Furthermore, successfully counterfeiting a debit card is more difficult than with a credit card, since the criminal must acquire not only the account number, but also the PIN, and then manufacture the card as in the credit card example. However, various strategies have been used to obtain PINs from unwary cardholders; these range from Trojan horse automated teller machines (ATMs) in shopping malls that dispense cash but record the PIN, to fraudulent seller point of sale devices that also record the PIN, to criminals with binoculars that watch cardholders enter PINs at ATMs. The subsequently manufactured counterfeit debit cards are then used in various ATM machines until the unlucky account is emptied.

Customer fraud, for both credit and debit cards, is also on the rise. Customers intent on this sort of fraud will claim that they lost their card, say that their PIN was written on the card, and then withdraw money from their account using card, and then refuse to be responsible for the loss.

The financial industry is well aware of the trends in fraud, and is constantly taking steps to improve the security of the card. However, the linkage between the buyer and his token is tenuous, and that is the fundamental reason behind card fraud today One possible solution to stolen-card fraud involves placing PIN protection for magnetic stripe credit cards, much as debit cards have PINs today. This will raise the administrative costs for each card, since cardholders will undoubtedly wish to select their own PIN for each of their 3.4 cards. In addition, this solution still doesn't address the problem of counterfeit cards.

Another solution that solves both stolen-card fraud and greatly reduces counterfeit-card fraud involves using a smartcard that includes either a biometric or a PIN. In this approach, authenticated biometrics are recorded from a user of known identity and stored for future reference on a token. In every subsequent access attempt, the user is required to physically enter the requested biometric, which is then compared to the authenticated biometric on the token to determine if the two match in order to verify user identity.

Various biometrics have been suggested, such as fingerprints, hand prints, voice prints, retinal images, handwriting samples and the like. However, because the biometrics are generally stored in electronic (and thus reproducible) form on a token and because the comparison and verification process is not isolated from the hardware and software directly used by the buyer attempting access, a significant risk of fraud still exists. Examples of this approach to system security are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210, 588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore, all of which are incorporated herein by reference.

An example of another token-based biometric smartcard system can be found in U.S. Pat. No. 5,280,527 to Gullman et al. In Gullman's system, the user must carry and present a credit card sized token (referred to as a biometric security apparatus) containing a microchip in which is recorded characteristics of the authorized user's voice. In order to initiate the access procedure, the user must insert the token into a terminal such as an ATM, and then speak into the terminal to provide a biometric sample for comparison with an authenticated sample stored in the microchip of the presented token. If a match is found, the remote terminal signals the host computer that the transaction should be permitted, or may prompt the user for an additional code, such as a PIN which is also stored on the token, before authorizing the transaction.

Although Gullman's reliance of comparison biometrics reduces the risk of unauthorized access as compared to PIN codes, Gullman's use of the token as the repository for the authenticating data combined with Gullman's failure to isolate the identity verification process from the possibility of tampering greatly diminishes any improvement to fraud resistance resulting from the replacement of a numeric code with a biometric. Further, the system remains inconvenient to the consumer because it too requires the presentation of a token in order to authorize a transaction.

Uniformly, the above patents that disclose commercial transaction systems teach away from biometric recognition without the use of tokens. Reasons cited for such teachings range from storage requirements for biometric recognition systems to significant time lapses in identification of a large number of individuals, even for the most powerful computers.

Unfortunately, any smartcard-based system will cost significantly more than the current magnetic stripe card systems currently in place. A PIN smartcard costs perhaps $3, and a biometric smartcard will cost $5. In addition, each point of sale station would need a smartcard reader, and if biometrics are required, a biometric scanner will also have to be attached to the reader as well. With 120 million cardholders and 5 million stations, the initial conversion cost is from two to five times greater than the current annual fraud losses.

This large price tag has forced the industry to look for new ways of using the power in the smartcard in addition to simple commercial transaction. It is envisioned that in addition to storing credit and debit account numbers and biometric or PIN authentication information, smart cards may also store phone numbers, frequent flyer miles, coupons obtained from stores, a transaction history, electronic cash usable at tollbooths and on public transit systems, as well as the buyer's name, vital statistics, and perhaps even medical records.

The net result of "smartening" the token is centralization of function. This looks good during design, but in actual use results in increased vulnerability for the consumer. Given the number of functions that the smartcard will be performing, the loss or damage of this monster card will be excruciatingly inconvenient for the cardholder. Being without such a card will financially incapacitate the cardholder until it is replaced. Additionally, losing a card full of electronic cash will also result in a real financial loss as well.

Thus, after spending vast sums of money, the resulting system will definitely be more secure, but will result in heavier and heavier penalties on the consumer for destruction or loss of the card.

To date, the consumer financial transaction industry has had a simple equation to balance: in order to reduce fraud, the cost of the card must increase. As a result, there has long been a need for a commercial transaction system that is highly fraud-resistant, practical, convenient for the consumer, and yet cost-effective to deploy.

There is also a need for a commercial transaction system that uses a strong link to the person being identified, as opposed to merely verifying a buyer's possession of any physical objects that can be freely transferred. This will result in a dramatic decrease in fraud, as only the buyer can authorize a transaction.

A further need in a commercial transaction system is ensuring consumer convenience by providing authorization without forcing the consumer to possess, carry, and present one or more proprietary objects in order to authorize a transaction. All parties intent on fighting fraud recognize that any system that solves the fraud problem must take the issue of convenience into account, however the fundamental yet unrecognized truth of the situation is, the card itself can be very inconvenient for the consumer. This may not be initially obvious, but anyone who has lost, left at home, or had a card stolen knows well the keenly and immediately-felt inconvenience during the card's absence.

Yet another need in the industry is for a transaction system that greatly reduces or eliminates the need to memorize multiple or cumbersome codes. Such a system must allow a user to access all of his accounts, procure all services to which he is entitled, and carry out transactions in and between all financial accounts, make point of purchase payments, etc.

There is further a need for a commercial transaction system that affords a consumer the ability to alert authorities that a third party is coercing the transaction without the third party being aware that an alert has been generated. There is also a need for a system that is nevertheless able to effect, unknown to the coercing third party, temporary restrictions on the types and amounts of transactions that can be undertaken.

Lastly, such a system must be affordable and flexible enough to be operatively compatible with existing networks having a variety of electronic transaction devices and system configurations.

SUMMARY OF THE INVENTION

The invention as described provides a method and system for tokenless authorization of commercial transactions between a buyer and a seller using a computer system. The method comprises the steps of registering a buyer, wherein the buyer registers with the computer system a PIN, at least one registration biometric sample, and at least one buyer financial account. The method also includes a seller registration step, wherein the seller registers with the computer system at least one seller financial account. In a proposal step, the seller offers a proposed commercial transaction to the buyer usually comprising price information. If the buyer accepts the seller's proposal, in an acceptance step, the buyer signals his/her acceptance by adding to the proposed commercial transaction the buyer's personal authentication information comprising a PIN and at least one bid biometric sample which is obtained from the buyer's person. In a transmission step, the bid biometric sample and PIN are forwarded to the computer system. The computer system compares the bid biometric sample with registration biometric samples for producing either a successful or failed identification of the buyer in a buyer identification step. Upon determination of sufficient resources, a financial account of the buyer is debited and a financial account of the seller is credited, in a payment step. Therefore, a commercial transaction is conducted without the buyer having to use any portable man-made memory devices such as smartcards or swipe cards. In a presentation step, any combination of the results of any of the above-mentioned steps is presented to the buyer or seller.

In an alternate embodiment, the computer system constructs a transaction given the buyer and seller financial accounts, the transaction amount, and the associated transaction information, and forwards the transaction to an external computer system, such as one operated by VISA International, where the money transfer occurs and any status of success or failure returned by the external computer system is forwarded by the computer system to the buyer and seller. Alternatively, the transaction is forwarded to an external computer system such as Visa through an acquirer such as First Data Corporation.

When the computer system completes an operation, such as a registration of a buyer or a seller, or a particular transaction succeeds or fails, a presentation step provides the results of the operation to the buyer and/or the seller.

In this manner, commercial transactions are conducted without the buyer having to use any portable man-made memory tokens such as smartcards or magnetic stripe cards.

In a preferred embodiment of the invention, the identification step occurs in less than two seconds, which is a commercially acceptable timeframe.

In some situations, it may be possible for people intent on fraud to substitute fake transaction stations for actual transaction stations in order to capture an unsuspecting buyer's biometric and PIN. To counter this, another embodiment of the invention provides a way for the buyer to authenticate the system. During registration, the buyer selects a private code in addition to biometric, PIN, financial accounts, and account index codes. Alternatively, the computer system selects the account index codes for the buyer's financial accounts. The private code is unrelated to the PIN, and is not used to gain access to the system. The private code is displayed to the buyer at the end of each transaction. Only the computer system and the buyer know the private code, which is never entered by the buyer during the transaction. Since a fake station cannot display the private code to the buyer, any attempt to steal biometric and PIN information is immediately obvious to a buyer.

For some transactions, it is not appropriate to conduct an immediate debit/credit of accounts. These cases include transactions where the exact amount to be transferred is not known at the time of authorization, or when a deposit is reserved by the seller for security reasons that will probably never be collected. As a result, in an alternate embodiment of the invention, the computer system causes a credit authorization draft to be constructed up to the limit supplied in the commercial transaction, instead of executing an immediate debit/credit transaction.

In yet another embodiment of the invention, the computer system communicates with one or more external computer systems in order to perform various functions, including determining if the buyer has sufficient resources, the debiting of a buyer's financial account, the crediting of the seller's financial account, or the construction of a credit authorization draft.

In another embodiment of the invention, the buyer is remote from the seller, and transaction proposals and other information is transmitted from seller to buyer and vice versa using a computer network such as the Internet.

In yet another embodiment of the invention, the seller identification code is identical to the seller's financial account. In another embodiment of the invention, each account index code has associated with it a name assigned by the account owner during registration. This account name can be displayed during authorization in the event the owner forgets which accounts are available for use.

In most instances, the buyer being identified and the computer system are remote and physically separate from each other. All electronic communications to and from the computer system are encrypted using industry standard encryption technology, preferably the DES (Data Encryption Standard) with 112-bit encryption keys. Each identification station has its own set of encryption keys that are known only to that particular station and the computer system.

It is preferred that the invention include a method for comparing the biometric samples during registration with a collection of biometric samples from buyers who have been designated as having previously attempted to perpetrate fraud or who have actually perpetrated fraud upon the system, thus eliminating registration of repeat offenders.

Yet another embodiment of the invention creates increased assurance of accurate identification by comparing a buyer's biometric from among a basket of other biometrics, the basket being a subset of all stored biometrics in the system. This is done by first comparing the buyer's biometric with all others in the basket and storing his in that basket only when it is deemed to be sufficiently dissimilar from the other biometrics therein.

In another embodiment of the invention, the buyers choose their own PIN from a group of PINs provided by the computer system. Once the buyer's biometric is gathered, the data processing center selects several PINs at random which may be conducive to being memorized. The computer system then conducts a comparison of the biometric gathered with those already in those PIN baskets. In the event the new registrant's biometric is too similar to any of the registered biometrics currently in the particular PIN basket, that PIN is rejected and an alternative PIN is selected for another such biometric comparison. Once the computer system has generated several PIN options without a confusingly similar biometric, these PINs are presented to the new registrant from which the buyer may select one PIN.

In another embodiment of the invention, in the unlikely event of the theft of biometric information, the situation can be remedied by simply changing the PIN basket in which the person's biometric samples reside. After this is done, the criminal can no longer use the biometric sample to authorize transactions.

The present invention is clearly advantageous over the prior art in a number of ways. First, it is extremely easy and efficient for the consumer to use because it eliminates the need to carry and present any tokens in order to access one's accounts. The present invention eliminates all the inconveniences associated with carrying, safeguarding, and locating tokens. Further, because tokens are often specific to a particular computer system that further requires remembering a secret PIN code assigned to the particular token, this invention eliminates all such tokens and thereby significantly reduces the amount of memorization and diligence increasingly required of consumers by providing protection and access to all financial accounts using only one personal identification number. The consumer is now uniquely empowered to conveniently conduct his personal and/or professional electronic transactions at any time without dependence upon tokens which may be stolen, lost or damaged.

The invention is clearly advantageous from a convenience standpoint to retailers and financial institutions by making purchases and other financial transactions less cumbersome and more spontaneous. The paperwork of financial transactions is significantly reduced as compared to credit card purchases wherein separate receipts are generated and must be retained by the seller and the consumer.

Because the system of the invention is designed to provide a consumer with simultaneous direct access to all of his financial accounts, the need for transactions involving money, checks, credit drafts and the like will be greatly reduced, thereby reducing the cost of equipment and staff required to collect, account, and process such transactions.

Further, the substantial manufacturing and distributing costs of issuing and reissuing all tokens such as credit cards, debit cards, telephone calling cards and the like will be eliminated, thereby providing further economic savings to issuing banks, and ultimately to consumers.

Moreover, the invention is markedly advantageous and superior to existing systems in being highly fraud resistant. As discussed above, present authorization systems are inherently unreliable because they base determination of a user's identity on the physical presentation of a manufactured object along with, in some cases, information that the user knows.

Unfortunately, both the token and information can be transferred to another, through loss, theft or by voluntary action of the authorized user. Thus, unless the loss or unintended transfer of these items is realized and reported by the authorized user, anyone possessing such items will be recognized by existing authorization systems as the consumer to whom that token and its corresponding financial accounts are assigned.

By contrast, the present invention virtually eliminates the risk of granting access to unauthorized users by determining identity from an analysis of a user's unique characteristics. Even in the very rare circumstance of coercion, where an authorized buyer is coerced by a coercing party to access his accounts, the system anticipates an emergency account index code, whereby the authorized user can alert authorities of the transgression without the knowledge of the coercing party.

The invention further prevents fraud by storing authentication information and carrying out identity verification operations at a location that is operationally isolated from the user requesting authorization, thereby preventing the user from acquiring copies of the authentication information or from tampering with the verification process. Such a system is clearly superior to existing token-based systems wherein the biometric authentication information are stored on and can be recovered from the token, and wherein the actual identity determination is performed at the same location as the user during the authorization process.

It is an object of the invention therefore to provide a commercial transaction system that eliminates the need for a user to possess and present a physical object, such as a token, in order to authorize a transaction.

It is another object of the invention to provide a commercial transaction system that is capable of verifying a user's identity based on one or more unique characteristics physically personal to the user, as opposed to verifying mere possession of proprietary objects and information.

Yet another object of the invention is to provide a commercial transaction system that is practical, convenient, and easy to use, where buyers no longer need to remember multiple PINs to protect multiple accounts.

Another object of the invention is to provide increased security in a very cost-effective manner, by completely eliminating the need for ever more complicated and expensive tokens.

Still another object of the invention is to provide a commercial transaction system that is highly resistant to fraudulent access attempts by non-authorized users.

Yet another object of the invention is to provide a commercial transaction system that enables a consumer to notify authorities that a particular transaction is being coerced by a third party without giving notice to said third party of the notification.

Another object of the invention is to provide a commercial transaction system that automatically restricts a consumer's transaction capabilities according a desired configuration provided by the user when a transaction is being coerced.

Still another object of the invention is to authenticate the system to the user once the commercial transaction is complete, so the user can detect any attempt by criminals to steal their authentication information.

Another object of the invention is to be added in a simple and cost-effective manner to existing online credit and debit terminals currently installed at points of sale around the world.

These and other advantages of the invention will become more fully apparent when the following detailed description of the invention is read in conjunction with the accompanying drawings.

DETAILED DESCRIPTION

The objective of this invention is to provide a tokenless method for identifying buyers for the purpose of authorizing financial transactions. It is the essence of this invention that consumers have the ability to conduct these transactions without the use of any tokens, credit cards, badges or identification cards including drivers licenses. In order to be functional it is important that the system operate at speeds similar to those currently in operation for completing financial transactions such as credit card purchases and ATM services. The system must be secure, such that buyers' records and their biometric information remain confidential and safe, both within the computer system that identifies the buyer and authorizes transactions, as well as during collection and transfer of authentication information between the computer system and the remote sites with which the computer system communicates.

Furthermore, the system must be reliable in that errors in identification and authorization must be infrequent and not hamper or make use of the system cumbersome. Since only the use of biometrics are contemplated for identification of buyers, the system must also have security measures during emergency cases to either reduce access, even to the authorized user, as well as notify authorities. It is appreciated that the system must be able to handle a large number of users, and accommodate storage and transfer of large amounts of data, such as biometric information, commensurate with speeds at which financial transactions are carried on today.

Figure 1:
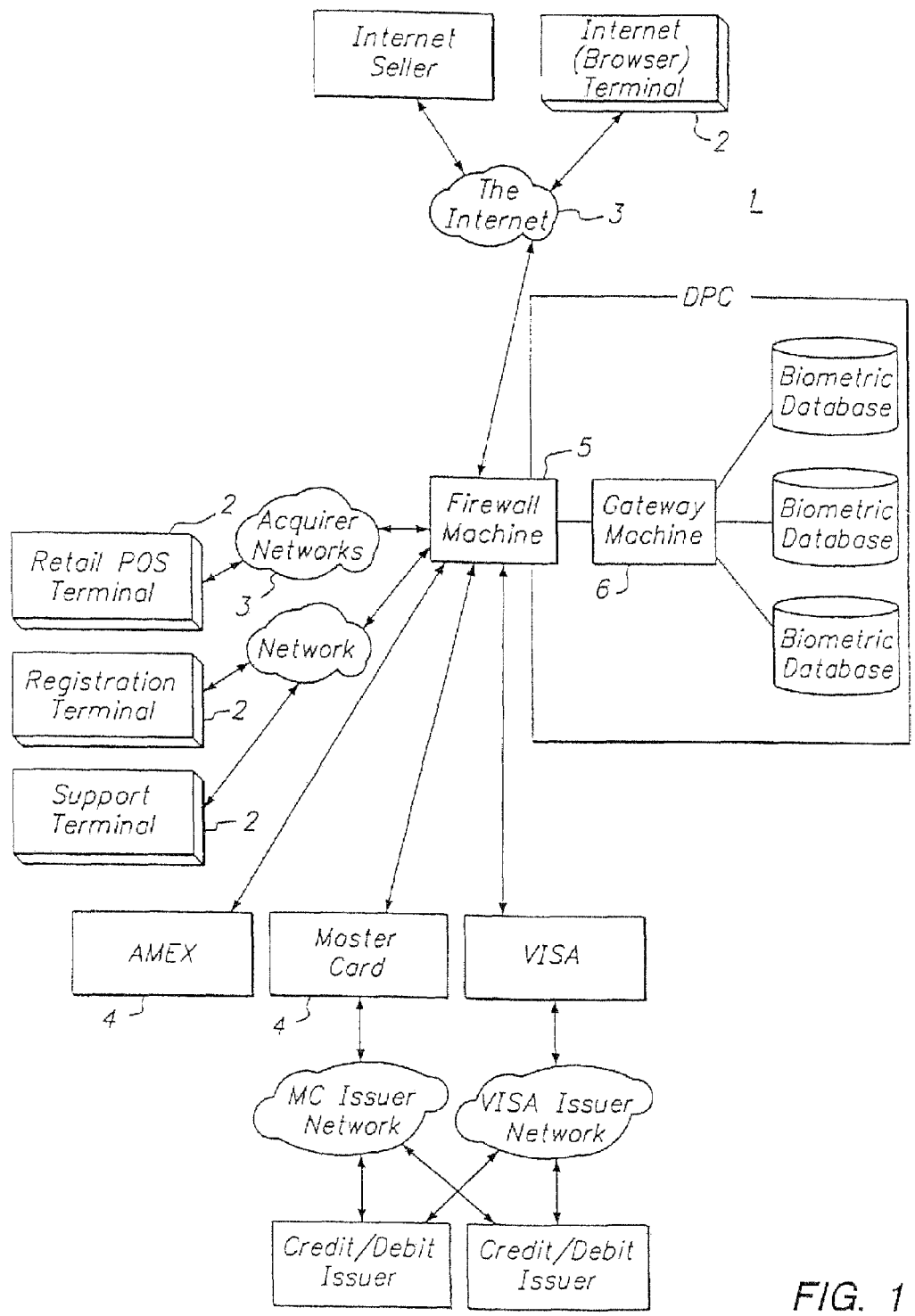
FIG. 1 is a diagram of an embodiment of the system of the present invention.
Figure 2:
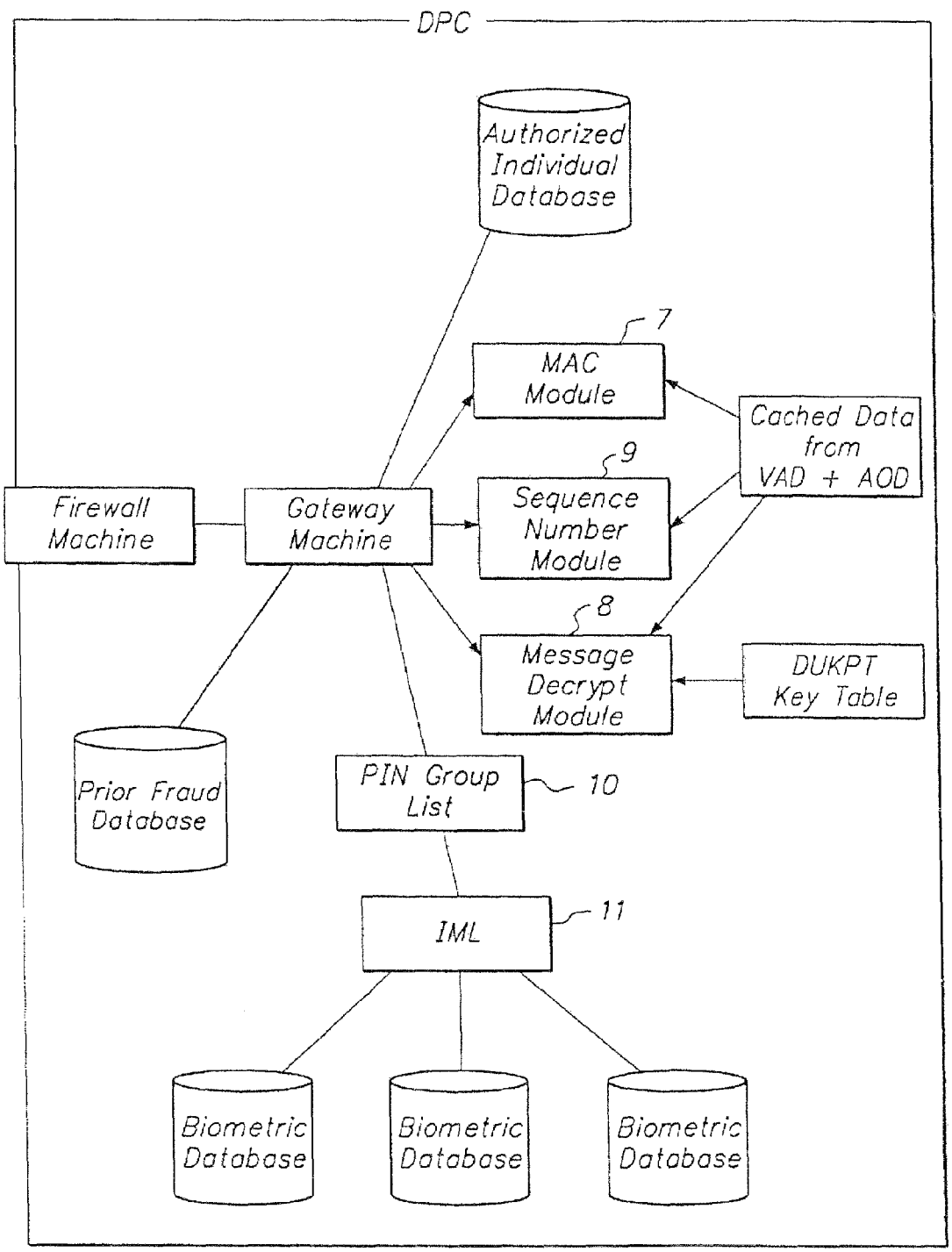
FIG. 2 is a diagram of an embodiment of the Data Processing Center (DPC) and its internal databases and execution modules.
Figure 3:
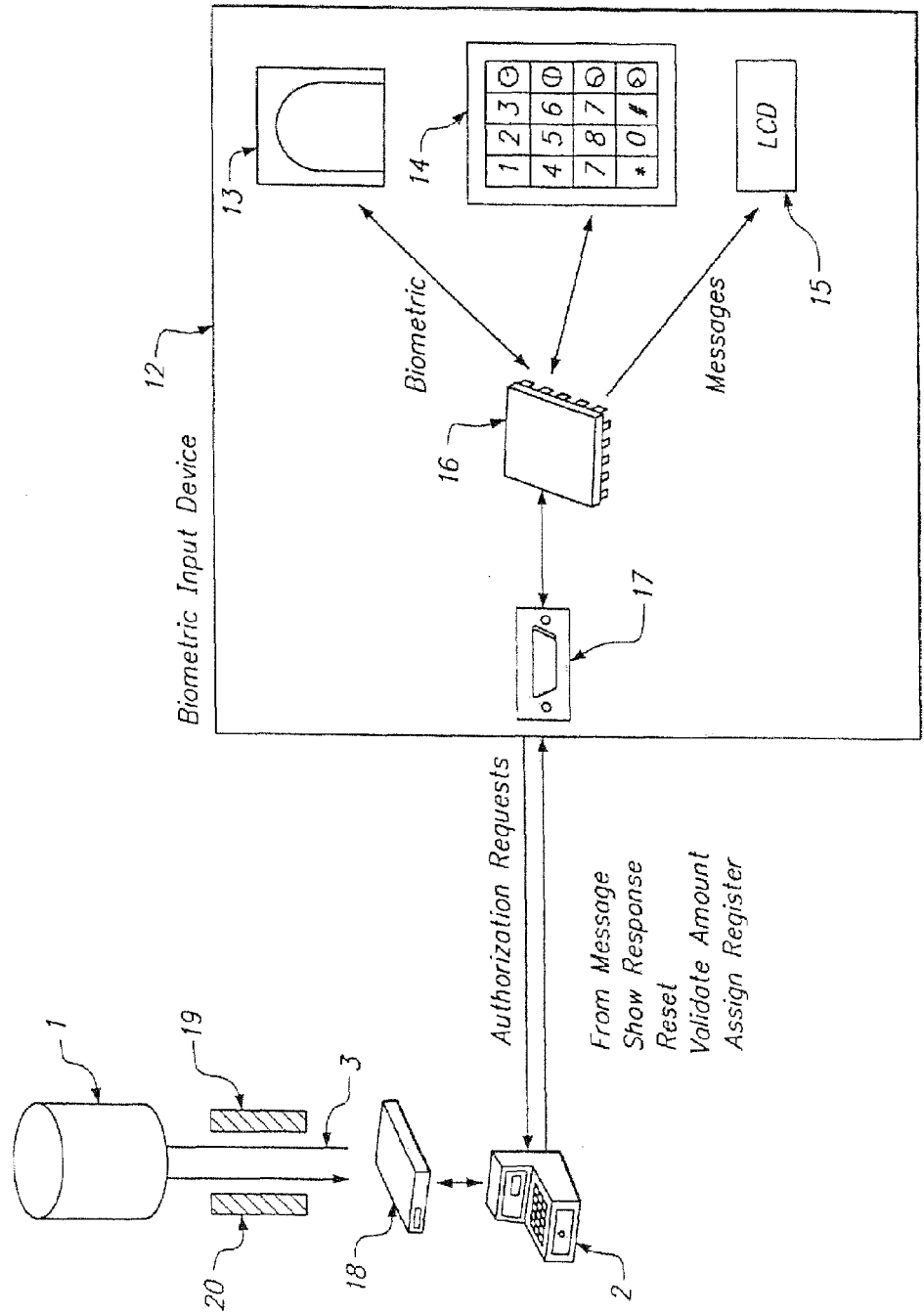
FIG. 3 is a diagram of an embodiment of the retail point of sale terminal, the biometric input apparatus and its components, and the interconnections between them.
Figure 4:
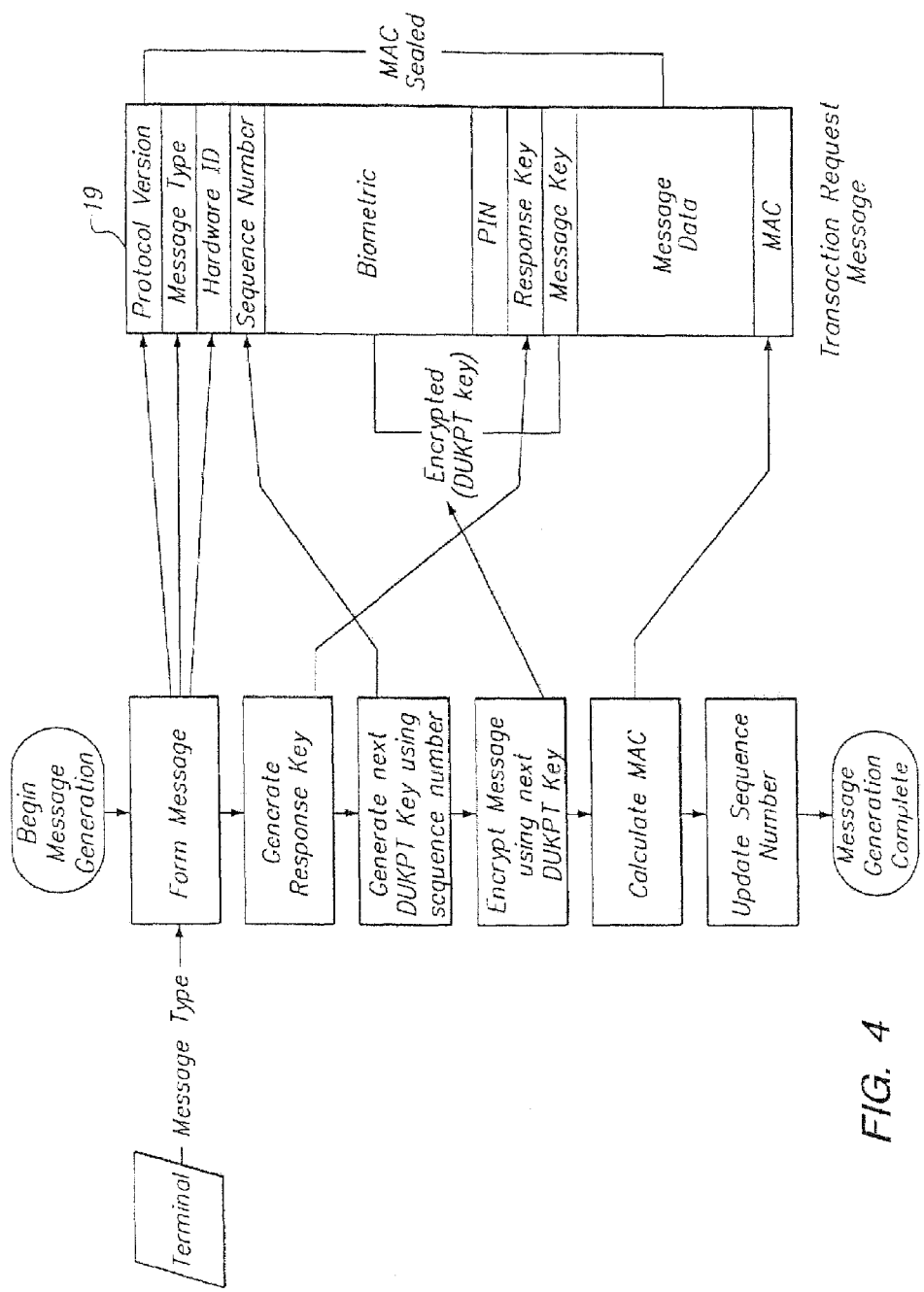
FIG. 4 is a flow chart of an embodiment of the operation of the biometric input apparatus and the terminal for generating a commercial transaction request message.
Figures 5, 6:
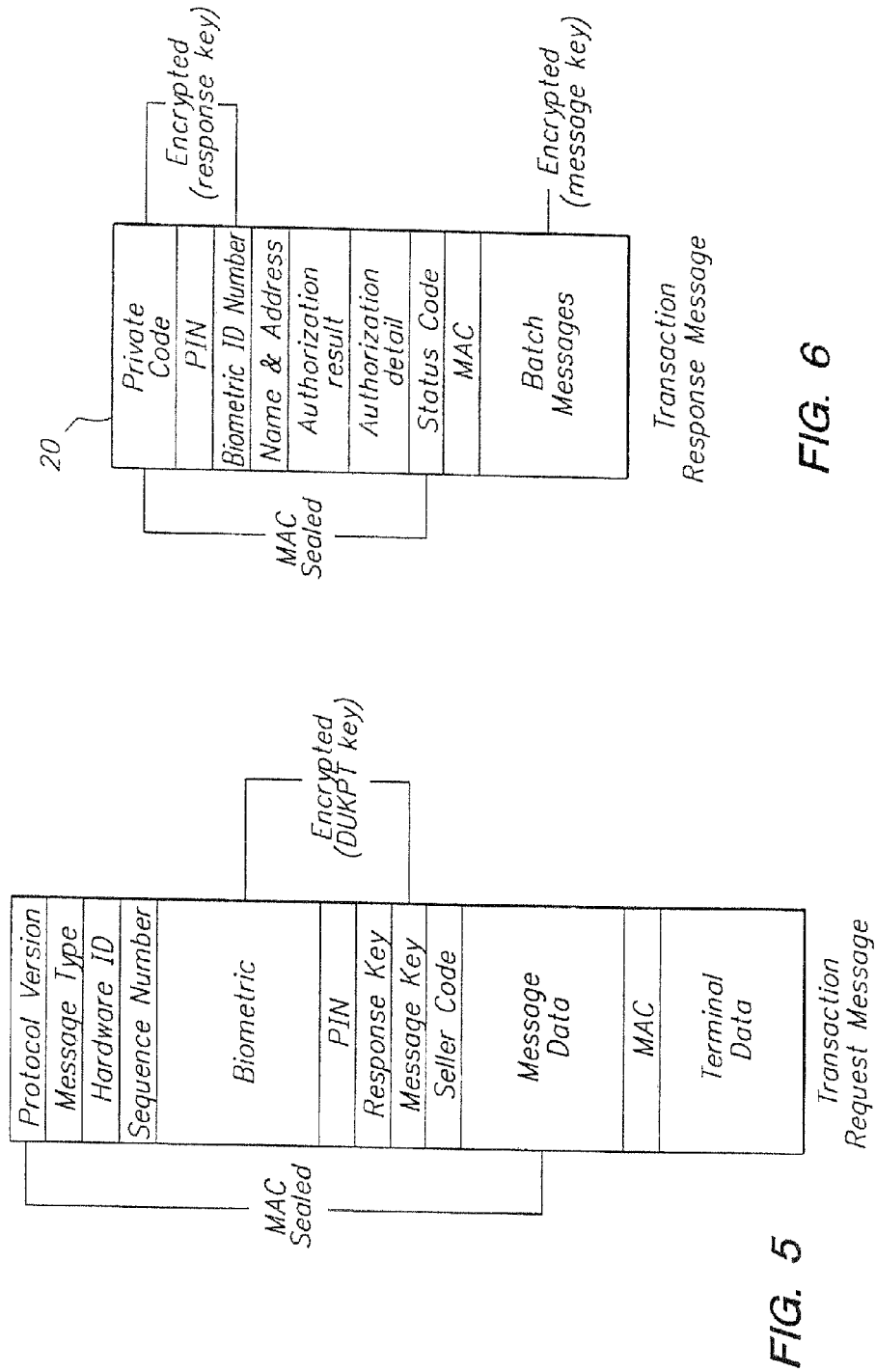
FIG. 5 is a representational diagram of an embodiment of a sample transaction request message.
FIG. 6 is a representational diagram of an embodiment of a sample commercial transaction response message.
Figure 7:
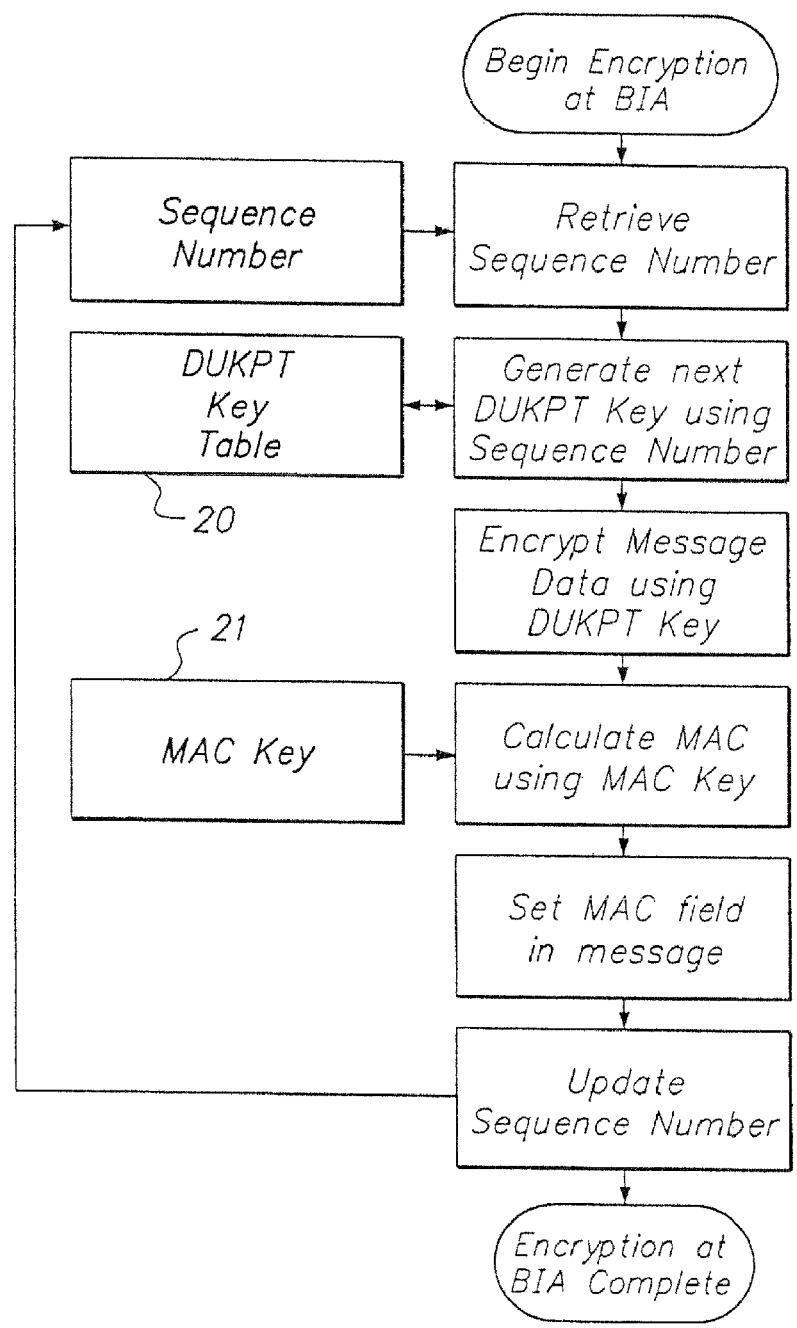
FIG. 7 is a flow chart depicting an embodiment of the data encryption and sealing process at the biometric input device.
Figure 8:
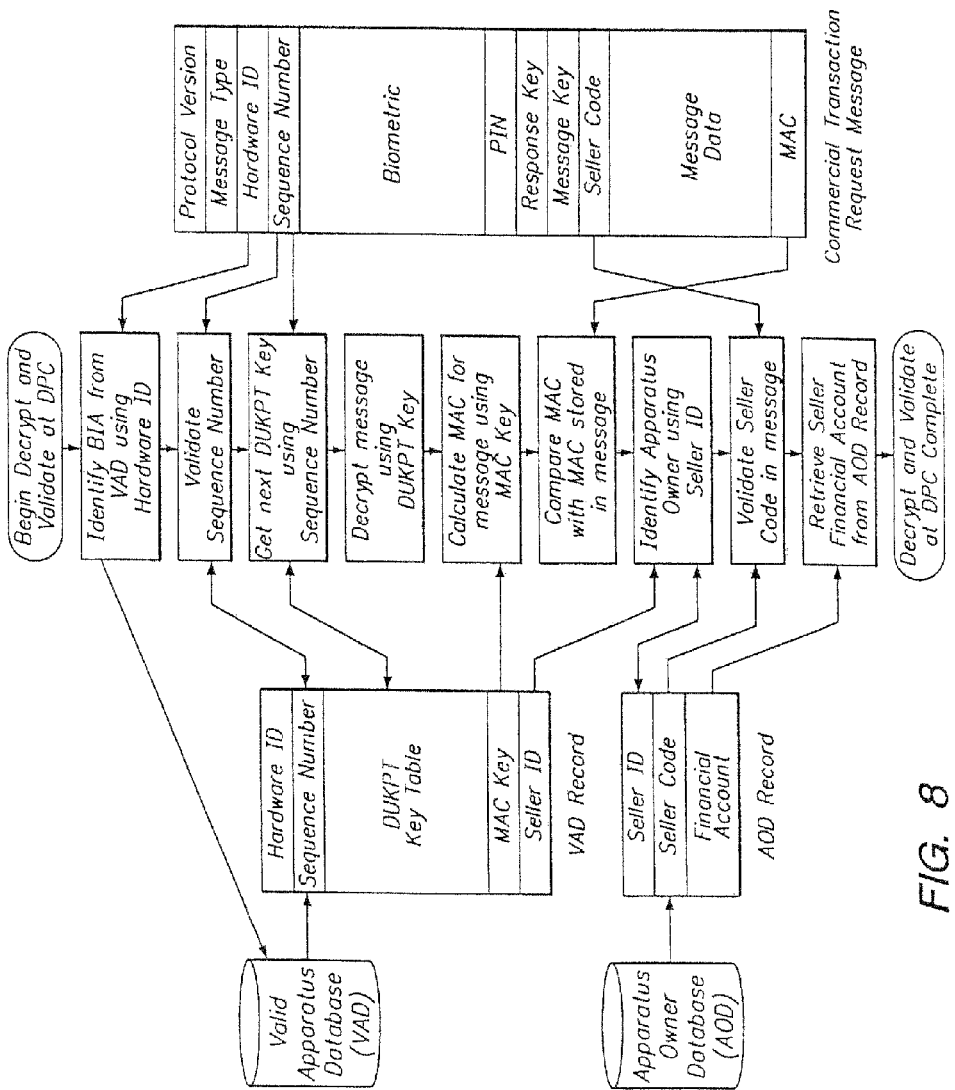
FIG. 8 is a flow chart depicting an embodiment of the message decryption and seller identification validation at the DPC.
Figure 9:
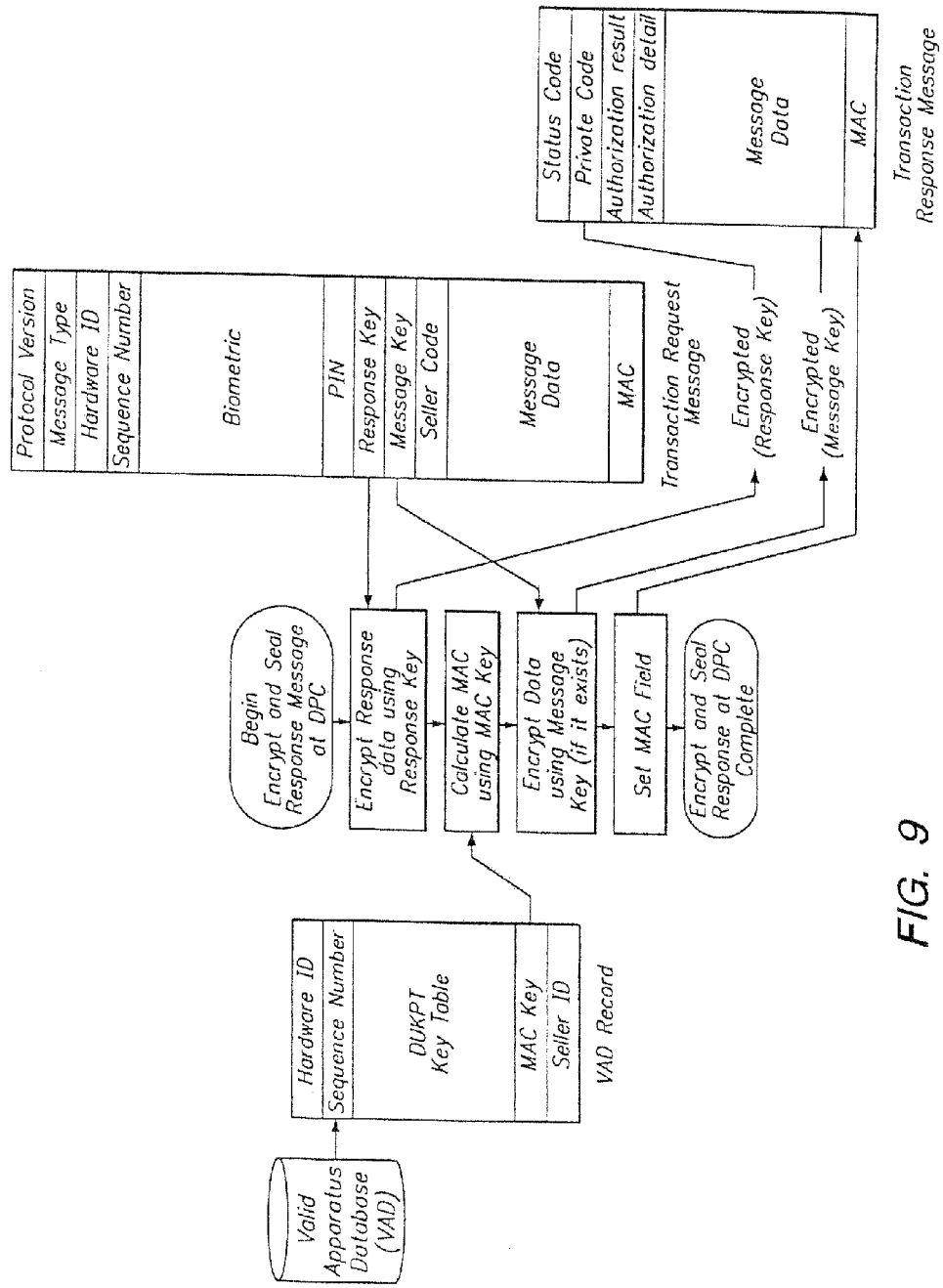
FIG. 9 is a flow chart depicting an embodiment of the data encryption and sealing process at the DPC.
Figure 10:
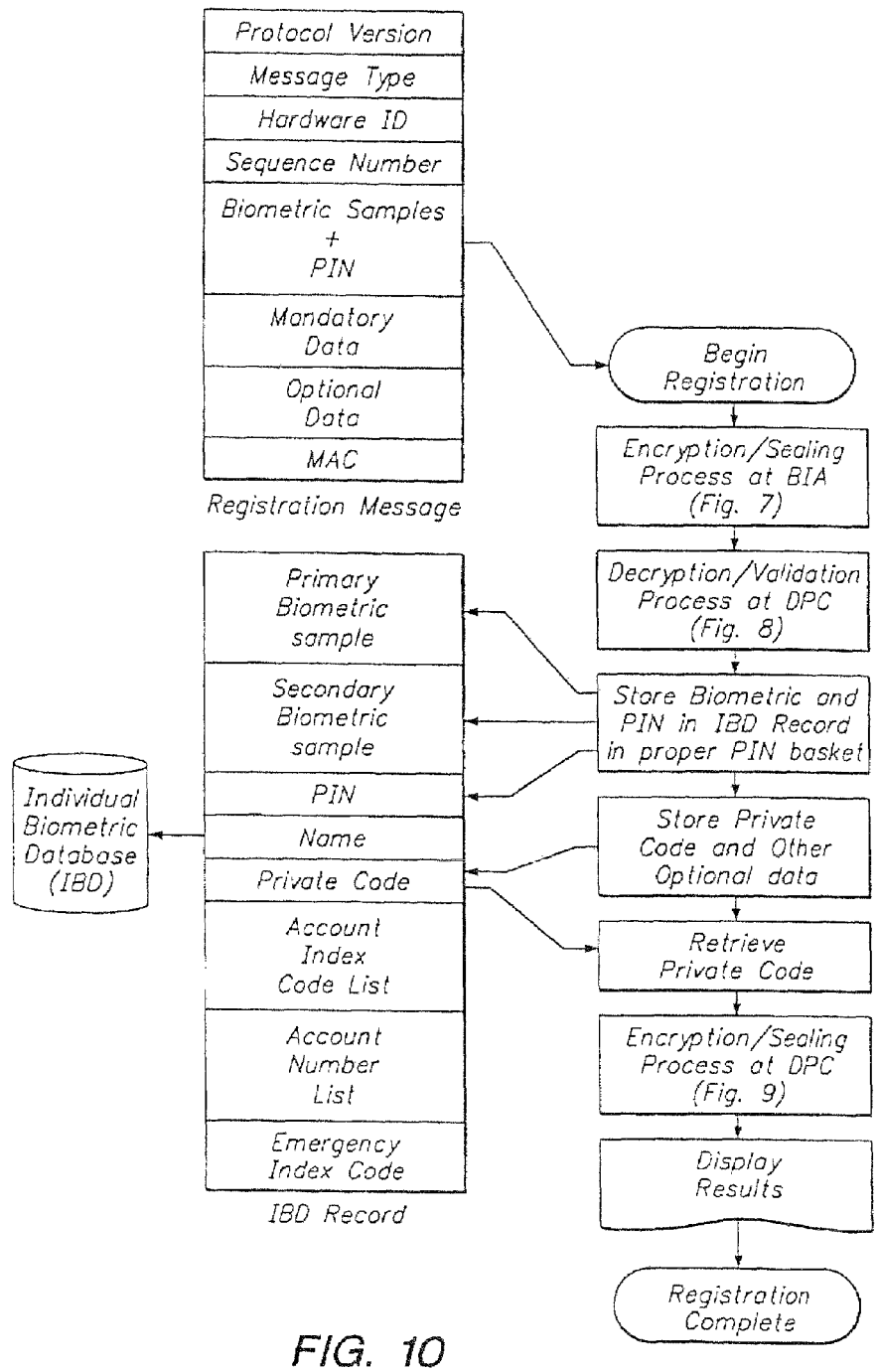
FIG. 10 is a flow chart representing an embodiment of the registration of a buyer during the registration process.
Figure 11:
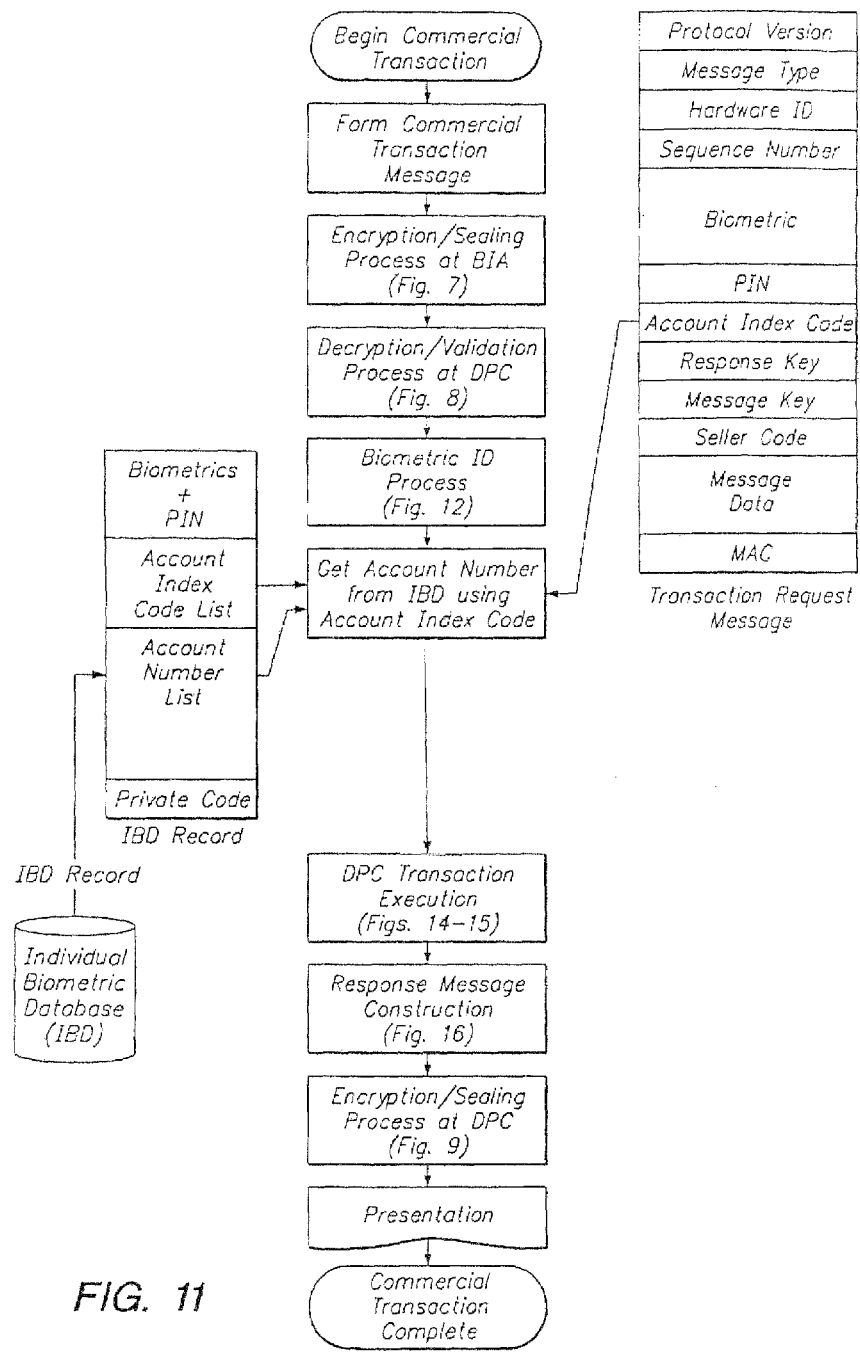
FIG. 11 is a flow chart of an embodiment of the operations performed in order to transmit, execute, and present the results of a transaction request message.
Figure 12:
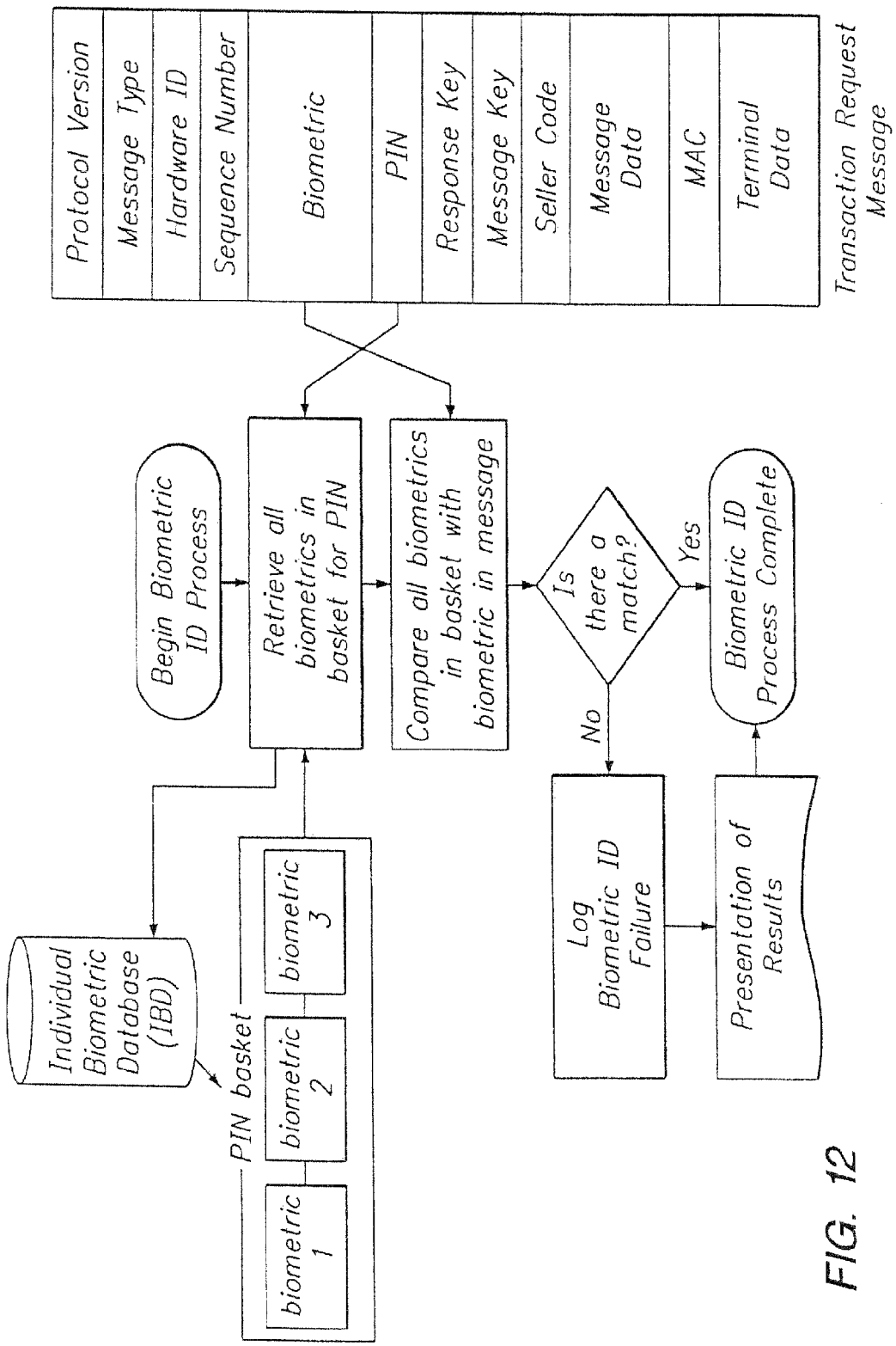
FIG. 12 is a flow chart of an embodiment of the biometric identification process at the DPC.
Figure 13:
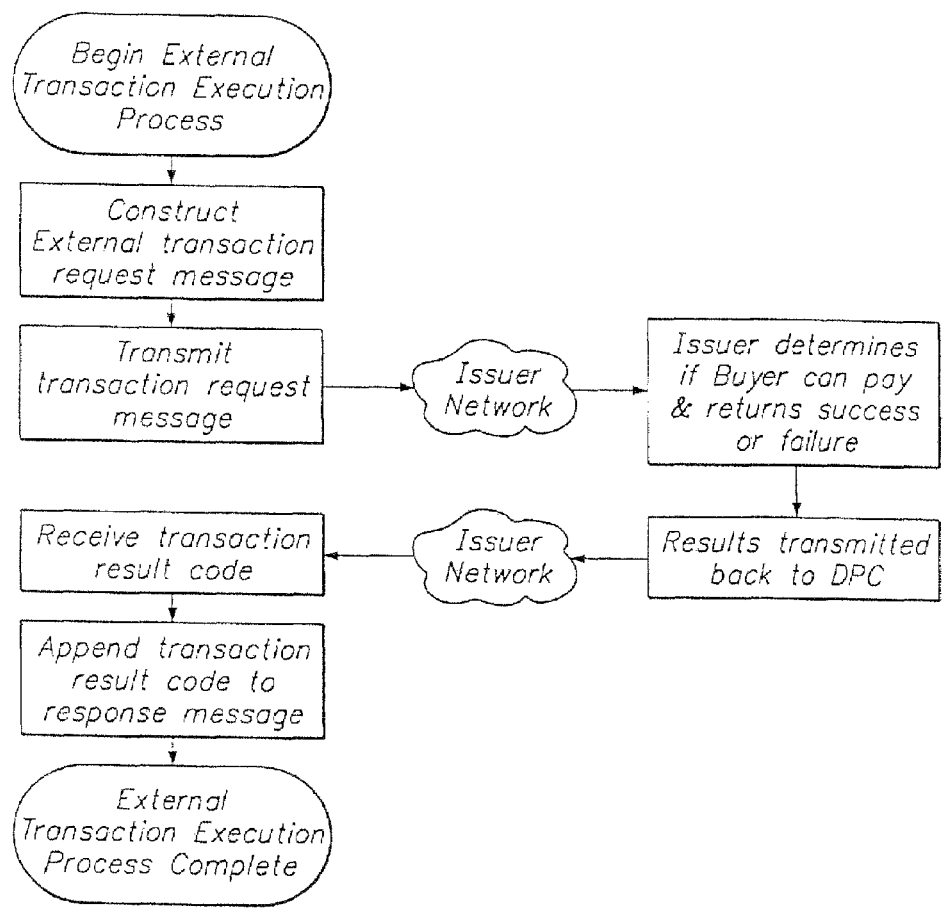
FIG. 13 is a flow chart of an embodiment of the execution of a transaction by an external computer system.
Figure 14:
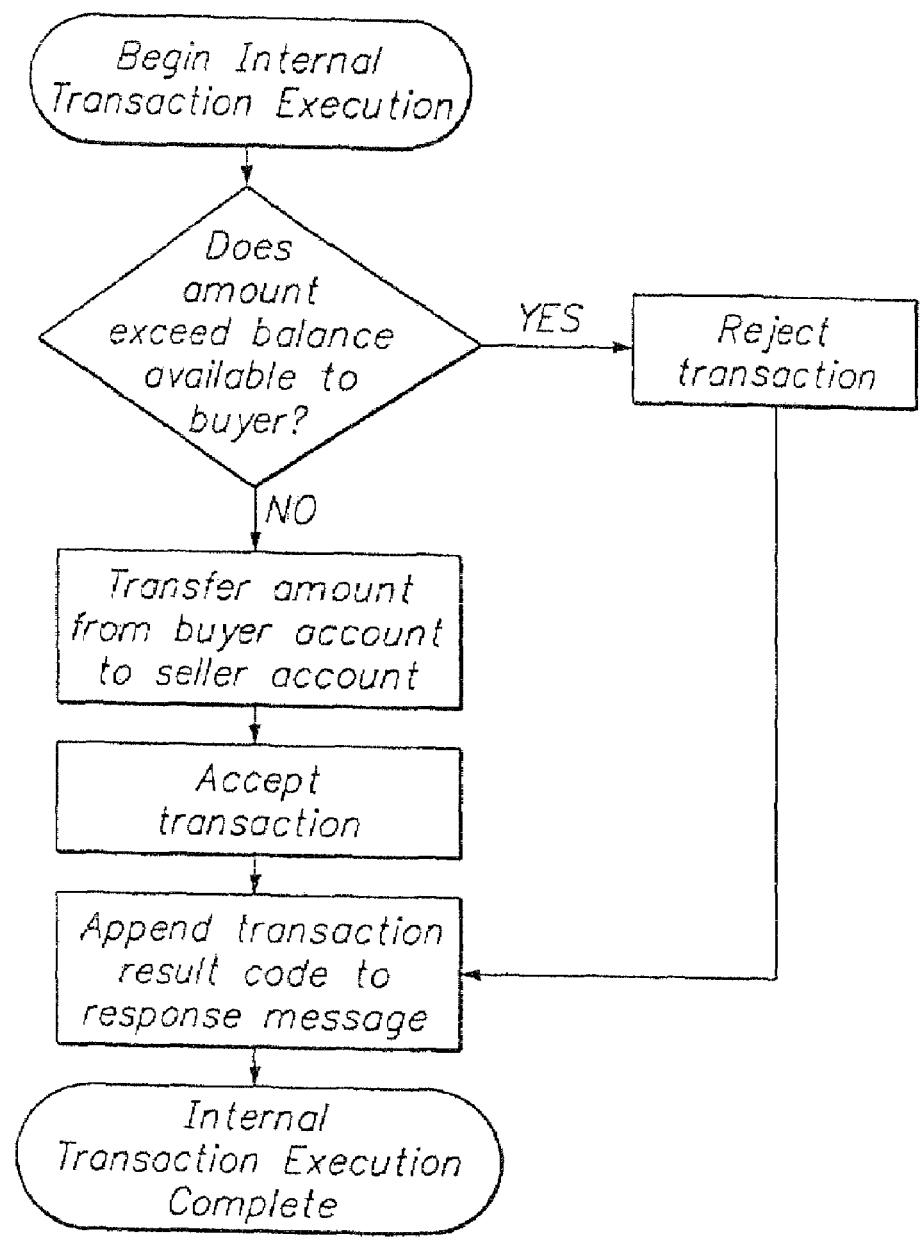
FIG. 14 is a flow chart of an embodiment of the execution of a transaction by the DPC.
Figure 15:
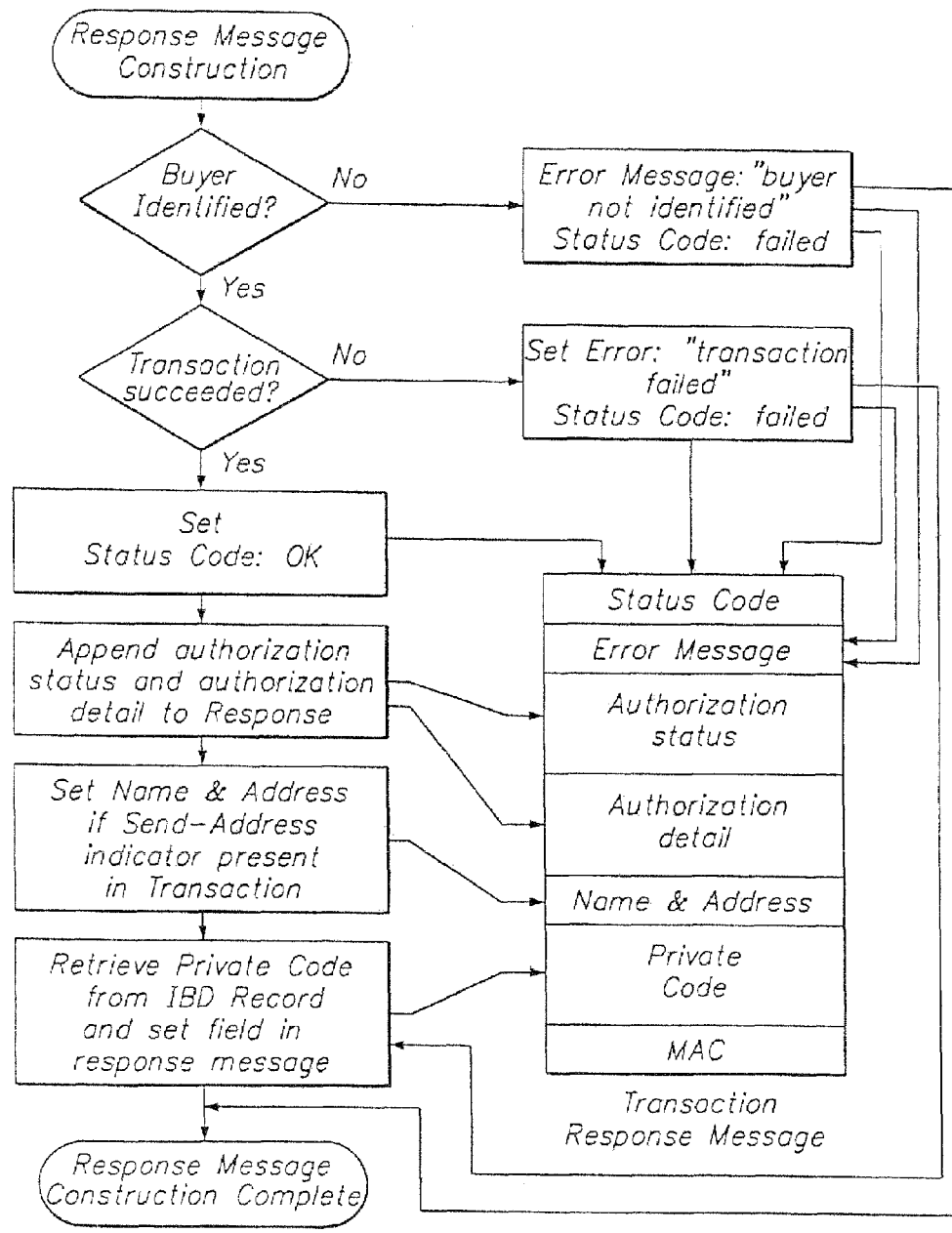
FIG. 15 is a flow chart of an embodiment of the construction of a response message for a given commercial transaction request message.
Figure 16:
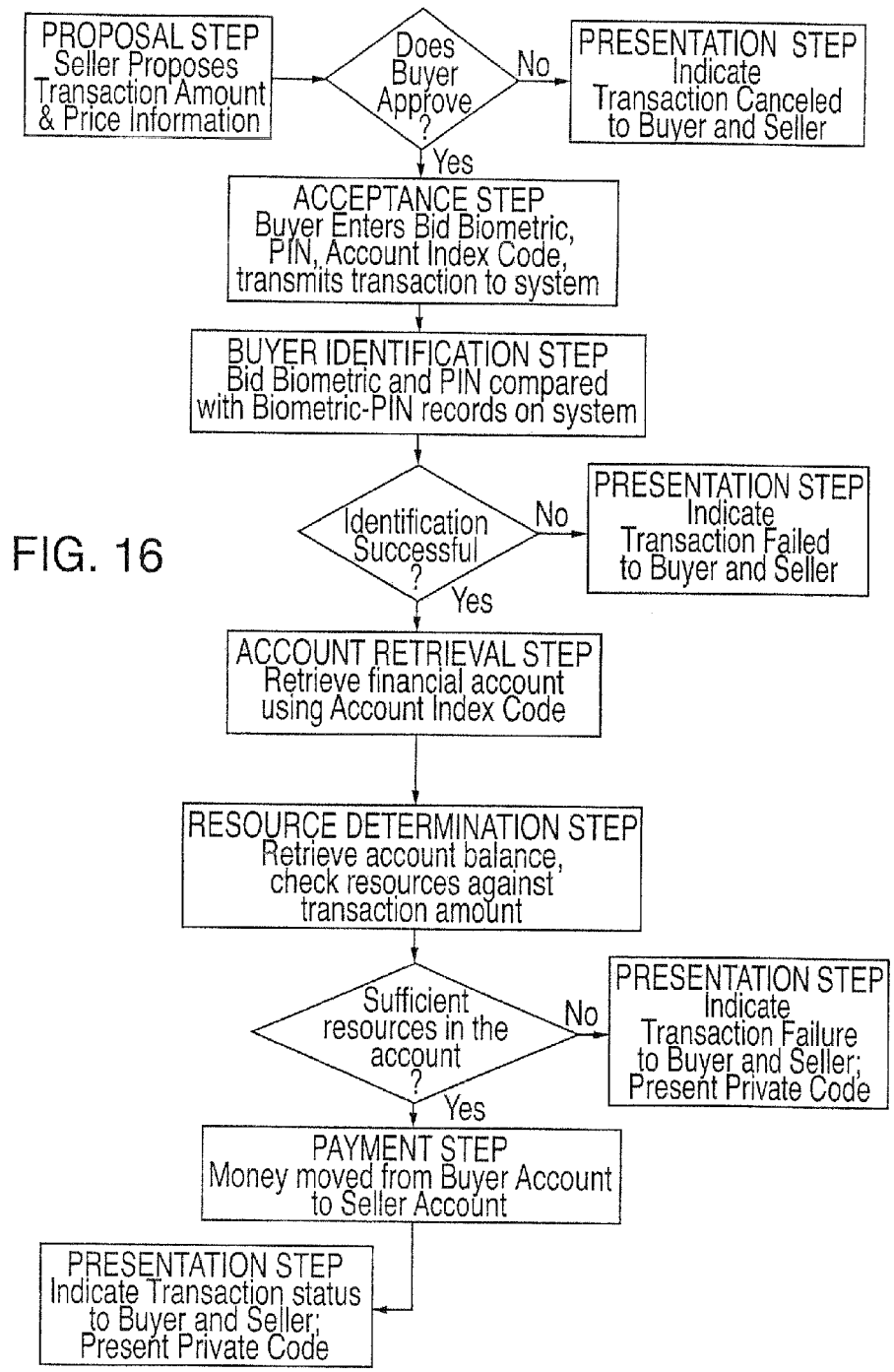
FIG. 16 is a flow chart of an embodiment of the general steps taken during the authorization of a commercial transaction in another embodiment.

Turning now to the figures, the overall configuration of the invention and its components are shown in FIG. 1. Essentially a Data Processing Center (DPC) 1 is connected to various terminals 2 through various types of communication means 3. The DPC is also connected and communicates with independent computer networks 4. The DPC contains several databases and software execution modules as shown in FIG. 2. In a preferred embodiment of the invention, the databases are backed up or "mirrored" in distinct physical locations for safety reasons. The Firewall Machine 5 is responsible for prevention of electronic intrusion of the system while the Gateway Machine 6 is responsible for routing all requests from the user, including adding, deleting and otherwise modifying all databases. The Gateway Machine is also responsible for decryption and de-packaging of data that has arrived from the terminals using the MACM module 7, MDM module 8, and the SNM module 9. The PGL module 10, and for large numbers of users preferably an IML module 11 are used to locate the proper biometric basket using the PIN. The PIN can be any combination of alphanumeric characters. FIG. 3 depicts an example of a terminal 2 and the biometric input device 12, which has a biometric scanner 13, data entry means such as a key pad or PIN pad 14, and a display panel 15. The biometric scanner can be any one of fingerprint scanner, voice input device (microphone), palm print scanner, retinal scanner or the like, although the fingerprint scanner will be used as an example. The biometric input device is further equipped with computing modules 16, device drivers, and erasable and non-erasable memory modules. The biometric input device communicates with the terminal through preferably a serial port 17. The terminal 2 communicates through a modem 18 with the DPC 1 through transaction request messages 19 and transaction response messages 20 using one of the interconnecting means in FIG. 1 such as a cable TV network, cellular telephone network, telephone network, the Internet, or an X.25 network. FIG. 4 shows a representational diagram of an embodiment of a transaction request message 19 and its method of generation by the biometric input device software. Alternatively, a transaction request message 19 may be generated without some of the indicated data. Therefore, various data and information regarding the same transaction may be forwarded to the DPC in different transaction request messages, FIG. 5 and FIG. 6 show a representational diagram of the transaction request message 19 and a transaction response message 20. Furthermore, it is shown which parts of the messages are optionally encrypted and which are optionally MAC sealed. FIG. 7 is a block diagram of the overall process for data encryption and MAC sealing showing the use of DUKPT key data for encryption of data before appending additional data before sealing the message with a Message Authentication Code (MAC) 21. FIG. 8 and FIG. 9 show the encryption and decryption process at the DPC. FIG. 10 shows the steps taken during registration of a user of the system. FIG. 11 describes the steps involved in processing a commercial transaction request message, starting from its formation at the BIA, processing by the DPC, and then finally the presentation of results by the BIA. FIG. 12 describes the biometric ID process at the DPC. Essentially, the DPC retrieves all the biometrics in a particular PIN basket identified by the PIN entered by the user/buyer. Thereafter, the user/buyer's biometric is compared with the biometrics in the PIN basket to produce either a failed successful identification process. FIGS. 13 and 14 describe the processing required to determine resources of a buyer and execute payment from a buyer to a seller, both internally to the DPC as well as externally via an external computer system. FIG. 15 describes how the DPC constructs a response to a particular transaction request message. FIG. 16 shows a description on the steps taken to process a commercial transaction, from proposal through presentation of results.

Description of the drawings, diagrams, flow charts and the description of the invention, including hardware components, software components, execution modules, databases, connection means, the data transferred between them, and the method of the invention is described in detail as follows.

1. Biometric Input Apparatus (BIA)

The BIA is a combination of hardware and software whose job is to gather, encode, and encrypt biometric input for use in commercial transactions. Actions of the BIA are directed by an outside controlling entity called a terminal, which issues commands and receives results over the BIA's serial line. BIA hardware comes in four basic versions: standard, wireless, and integrated phone/cable television (or "CATV").

BIA software comes in several basic versions: personal computer (or "PC"), retail and registration. Each software load provides a different, use-specific command set. For instance, the registration software load does not accept requests to form retail transaction messages. Likewise, the retail software command set cannot send buyer registration messages. In another embodiment of the invention, to provide another layer of security, the DPC knows what software package is loaded into each BIA; any attempts by a BIA to send a message that it is normally not able to send is rejected by the DPC and the event is treated as a major security violation.

In an alternative embodiment of the invention, each BIA is only allowed to perform operations limited to its designated function. Each biometric input apparatus has a hardware identification code previously registered with the DPC, which makes the biometric input apparatus uniquely identifiable to the DPC in each subsequent transmission from that biometric input device.

Terminals range from software applications running on personal computers to dedicated hardware/software systems developed for a particular use such as a retail point of sale. Regardless of the particular model, no BIA reveals unencrypted biometric information. BIA models without display means (such as LCD or LED screens) must reveal selected information (such as private codes) to the terminal for display, and as a result those particular terminal-BIA combinations are considered to be less secure.

Depending on the task at hand, BIA models are either partially or fully integrated with the terminal. Partially integrated devices are physically separate from the terminal, and they include wireless and standard retail point of sale BIAs. Fully integrated devices are contained within the physical enclosure of the terminal itself, for instance a telephone.

Preferably, no BIA ever discloses any secret encryption codes to any external source.

Particular BIA hardware models have different configurations. They are introduced in brief here:

BIA
    Standard model has computing module, biometric scanner, display means, communications port, data entry means encased in tamper-resistant case, and electronic detection means.

BIA/Wireless
    Standard model, but serial line replaced with a wireless communications module using external antenna. Used in restaurant point of sale.

BIA/PC
   Remote Commercial Transaction
   List Accounts
BIA/Registration
   Buyer Identification
   Buyer Registration
   List Accounts
BIA/Retail
   Commercial Transaction
   List Accounts The Standard BIA hardware is preferably a multichip module combined with a single-print scanner, a display screen, a serial port, and a PIN pad encased in a hard tamper-resistant case that makes attempts to penetrate obvious while also providing RF shielding for the contents.

The following components are amalgamated into a multichip module, called the BIA Multichip Module (a process for encapsulating several processors in one physical shell, well known in the industry), constructed to protect the communications pathways between the devices from easy wiretapping.
   Serial processor
   PIN pad processor
   LCD screen processor
   Biometric Scanner
   A/D processor
   High-speed DSP processor containing both flash and mask ROM
   General-purpose microprocessor
   Standard RAM
   EEPROM The following software packages and data are stored in mask ROM. Mask ROM is cheaper than other types of read only memory, but it is easily reverse engineered, and is not electronically erasable. As such only the non-critical commonly available code are placed here.
   MAC calculation library
   DUKPT Key Management library
   DES (with CBC) Encryption library
   Base-64 (8-bit to printable ASCII) converter library
   Public Key Encryption library
   Embedded Operating System
   Serial line device driver
   LCD device driver
   PIN pad device driver
   Scanner device driver
   Unique hardware identification code
   Multi-Language profiles The following standard data and software packages are stored in flash ROM. Flash ROM is more expensive, but it is much more difficult to reverse engineer, and most importantly, it is electronically erasable. All of the more critical information is stored here. Flash ROM is used in an attempt to increase the difficulty of duplicating a BIA.
   Unique DUKPT Future Key Table
   Unique 112-bit MAC Key
   DSP biometric quality determination algorithm
   DSP biometric encoding algorithm
   Random number generator algorithm
   Command function table The message sequence number, incremented each time a message is sent from the BIA, is stored in the EEPROM. EEPROM can be erased many times, but is also Nonvolatile—its contents remain valid across power interruptions.

The following data is stored in RAM. RAM is temporary in nature, and its contents are lost whenever power is lost.
   Encoded Biometric Register
   PIN Register
   Account Index Code Register
   Amount Register
   PIN-Block Key
   Message Key
   Response Key
   8 General Registers
   stack and heap space Each multichip module contains a "write-once" memory location that is irreversibly set following the initialization of the flash ROM. Whenever an attempt is made to download software to the flash ROM, this memory location is checked; if it is already been set, then the BIA refuses to load. This way, critical software and data keys may only be downloaded once into the device, at the time of manufacture.

All registers and keys are explicitly cleared when a transaction is canceled. Once a transaction is completed, registers are cleared as well. Once a "form message" command is executed, biometric, PIN, and account index code registers are also cleared, along with any encryption keys that aren't required for subsequent use.

It is important that the software not keep copies of registers or keys in stack variables.

Preferably, in an embodiment, the following associated hardware components comprise the standard BIA hardware module.
   BIA Multichip module
   Biometric scanner
   capacitance detector plate (known in the industry)
   lighted PIN keypad with auxiliary buttons
   2-line 40-column LCD screen
   RF shielding
   tamper-resistant case
   serial connection (up to 57.6 kb)
   breech detection hardware (known in the industry)
   optional thermite charge attached to Multichip module (known in the industry)

All temporary storage and internal hardware and software used to calculate these values are secured, which means they resist any attempt to determine their current values, or their means of functioning. This feature is preferable for the security of the invention, just as it is desirable that the "wiretapping" of a BIA and specifically the gathering of a Biometric-PIN Block for fraudulent means is made as difficult as possible.

The multichip module and the components are physically connected to each other preferable without exposed wiring.

The Wireless version of BIA hardware is identical to the Standard model in construction, except that it communicates with the terminal using a spread-spectrum wireless communications module instead of a standard serial port.

This version is designed to be used in locations such as restaurants, where transactions are authorized at the buyer's convenience.

This device contains no Serial Port, however it does have an external antenna, and a spread-spectrum wireless serial transmission unit for communicating with the remote cash register Terminal.

2. BIA Software

The external interface to the BIA is much like a standard modem; commands are sent to it from a controlling terminal using the external serial line. When a command completes, a response code is sent from the BIA to the terminal. The particulars of the BIA software command interface detailed below illustrate one particular embodiment; other embodiments may mimic popular PIN pad interfaces, such as those manufactured by Verifone, Inc.

Each BIA software load supports a different set of operations. For instance, a retail load supports only commercial transactions, while a registration load supports buyer identification and buyer registration.

All BIA data fields are in printable ASCII, with fields separated by field separator control characters (FS), and records separated by newlines. Encrypted fields are binary converted to ASCII using the base-64 conversion library (all known in the industry).

Both the PIN and the account index code can be one or more alphanumeric characters, which includes numbers, letters, and other characters. For foreign languages, this includes multiple-character combinations are used to represent specific words or concepts in that language, such as kanji characters. For BIAs that just have a ten-digit keypad, the codes will simply be numbers as in a standard PIN code, though people may choose to use the standard telephone keypad alphabetic-to-keypad-number translations (e.g. ABC=1, DEF=2, etc.) to help them remember their codes. Embodiments of BIA Software Response Codes and BIA Software Commands are incorporated herein by reference from U.S. Pat. No. 5,613,012 to applicant.

4. Terminals

The terminal is the device that controls the BIA and connects to the DPC via modem, X.25 packet network, telephone network, the Internet, a private intranet, or even a Cable TV network, or some other mechanism for digital networking that is well-known in the industry. Terminals interact with different versions of the BIA to perform their tasks. Any electronic device that can issue commands to and receive results from the biometric input device is considered to be a terminal.

Some terminals are application programs that run on a general-purpose microcomputer, while other terminals are combinations of special-purpose hardware and software as show in FIG. 1.

In a preferred embodiment of the invention whenever a terminal provides information to the system, the system always validates it in some manner, either through presentation to the buyer for confirmation, or by cross-checking through other previously registered information.

While terminals are able to read some parts of BIA messages in order to validate that the data was processed properly by the BIA, terminals cannot read biometric identification information including the biometric data, the PIN, encryption keys, or account index codes.

Specific BIAs export some security functionality to the terminal, such as PIN entry, and private code display. As a result, such devices are regarded as somewhat less secure than their entirely self-contained counterparts, and as such have consequently lower security ratings.

There are many different terminal types; each is connected to a specific model BIA. Each terminal is described in brief below:

BRT (Buyer/User Registration Terminal)

Standard BIA with Registration software load attached to a microcomputer provides issuers with the ability to register new buyers with the system along with their financial accounts and other personal information.

IPT (Internet Point of Sale Terminal)

Standard BIA with personal computer software load attached to a microcomputer provides buyers with Internet connections the ability to purchase products from a seller that is connected to the Internet.

RPT (Retail Point of Sale Terminal)

Standard BIA with Retail software load attached to an X.25 network or using a modem allows a buyer to purchase items using commercial transactions in a store.

Terminal: Retail Point of Sale Terminal

The purpose of the RPT is to allow buyers to purchase items at a store without having to use either cash, check, or a debit or credit card.

The RPT uses a BIA/Retail to authorize financial transactions from a buyer to a seller. In addition to being used to accept biometric-PIN authorizations, the RPT provides standard debit and credit card scanning functions as well.

Note that only the biometric-related transactions are described in detail here. It is assumed that the RPT may also consist of standard credit and debit magnetic stripe card readers, as well as optional smart card readers too. An example of a RPT is a Verifone Tranz/330.

Each RPT is connected to the DPC by a modem, an X.25 network connection, an ISDN connection, or similar mechanism. The RPT may also be connected to other devices, such as an electronic cash register, from which it obtains the amount of the transaction and the seller identification code.

The RPT consists of:
 a BIA/Retail
 an inexpensive microprocessor
 modem or network interface hardware
 seller identification code number in non-volatile RAM
 a serial port for connecting to the BIA
 magnetic stripe card reader (known in the industry)
 ECR (electronic cash register) connection port
 optional smart card reader (known in the industry)

Two entities need to be identified for the DPC to respond positively to a BIA commercial transaction request message: the buyer and the seller.

The buyer is identified by the biometric-PIN, and the seller is identified by the DPC, which cross-checks the seller identification code contained in the BIA's VAD record with the seller identification code added to the transaction request by the RPT.

First, the seller enters the value of the transaction into his electronic cash register. This information is communicated to the BIA, along with the list of goods or services, date and time, any invoice numbers, the location, and the seller identification code. This represents the proposed commercial transaction. If the buyer approves, he either enters the amount or validates the amount, possibly asking for cash back, and then enters his biometric-PIN as well as his account index code. When the buyer completes his approval, the RPT instructs the BIA to construct the commercial transaction, and then sends the commercial transaction to the DPC through its network connection (modem, X.25, etc.).

When the DPC receives the transaction, it validates the biometric-PIN, obtains the account number using the index code, and cross-checks the seller identification code in the message with the registered owner of the BIA. If everything checks out, the DPC forms and sends a credit/debit transaction to execute the exchange, assuming the commercial transaction is to happen immediately. The response from the credit/debit network is added to the private code to form the transaction response message, which the DPC then sends back to the RPT. The RPT examines the response to see whether or not the transaction succeeded, and then forwards the response to the BIA, which then displays the buyer's private code, concluding the transaction.

Messages between the RPT and the DPC are secured by encryption and MAC calculation from the BIA. The MAC allows the RPT to review the unencrypted parts of the message, but the RPT cannot change them. Encryption prevents the encrypted part of the message from being disclosed to the RPT.

Each retail BIA must be registered to a seller. This helps to discourage BIA theft. Furthermore, because the RPT adds the seller identification code onto each message, replacing a seller's BIA with a different BIA is detected by the cross-check performed at the DPC.

Terminal: Internet Point of Sale Terminal

The purpose of an Internet Point of sale Terminal (IPT) is to authorize credit and debit financial transactions from a buyer at a computer to a seller, both of which are on the Internet.

Note that the Internet simply represents a general-purpose network where a seller, the DPC, and the IPT can all connect to each other in real time. As a result, this mechanism would work exactly the same on any other general-purpose network or collection of interconnected general-purpose networks.

The IPT consists of:
  a BIA/PC
  a microcomputer
  an Internet Shopper software application
  an Internet (or other network) connection In addition to identifying the buyer, the IPT must also identify the remote seller who is the counterparty to the transaction. The seller must also identify both the DPC and the IPT.

The Internet Shopper program stores the hostname (or other form of net name) of the seller from which the purchase is taking place so that the DPC can verify the seller's identity. This is called the seller's identification channel. Since the seller registers all of his legitimate Internet hosts with the DPC, this allows the DPC to cross-check the seller identification code with the seller identification code stored under that hostname to verify the seller's identity.

First, the IPT connects to the seller using the Internet. Once a connection is established, the IPT secures it by generating and then sending a Session Key to the seller. In order to assure that the session key is protected from disclosure, it is encrypted with the seller's Public Key using Public Key Encryption. When the seller receives this encrypted Session Key, he decrypts it using his Private Key. This process is called securing a connection through a Public Key Encrypted secret key exchange.

Once connected, the IPT downloads the seller identification code, and both price and product information from the seller. Once the buyer is ready to make a purchase, he selects the merchandise he wishes to buy. Then, the buyer enters the biometric-PIN using the BIA/PC, the IPT sends the seller identification code, the product identification information, and the amount to the BIA, and instructs it to construct a Remote Commercial Transaction Message. Then the IPT sends the request to the seller via the secure channel.

The seller is connected to the DPC via the same sort of secure connection that the IPT has with the seller, namely, using Public Key Encryption to send a secure session key. Unlike the IPT-seller connection, however, seller-DPC session keys are good for an entire day, not for just one connection.

The seller connects to the DPC, securing the connection using the session key, forwarding the transaction to the DPC for validation. The DPC validates the biometric-PIN, cross-checks the seller identification code contained in the request with the seller identification code stored under the hostname that was sent in the request, and then sends a transaction to the credit/debit network. Once the credit/debit network responds, the DPC constructs a response message including the credit/debit authorization, an encrypted private code, and the address of the buyer, and sends that message back to the seller.

Once the seller receives the response, it copies the buyer's mailing address out of the response, makes note of the authorization code, and forwards the response message to the IPT.

The IPT hands the response to the BIA, which decrypts the private code and displays it on the LCD screen, indicating that the DPC recognized the buyer. The IPT also shows the result of the transaction as well, be it success or failure.

Since the system in general assumes that an adversary inhabiting the network can hijack network connections at any point, all parties must have secure communications during their real-time interactions. The main concern isn't disclosure of information, but rather insertion or redirection of messages.

The whole system of Public Key Encryption relies on having a trusted source for the Public Keys. These trusted sources are called Certifying Authorities, one of which is the company VeriSign, Inc.

Terminal: Buyer/User Registration Terminal

The purpose of the Buyer Registration Terminal (BRT) is to register new buyers including their biometric-PIN, mailing address, private code, and a list of financial accounts and account index codes that they can access, all using their biometric-PIN.

The objective of the enrollment process is to obtain personal information from a buyer at the location of a responsible institution where that information can be validated. This includes, but is not limited to retail banking outlets and credit card issuers. Each participating responsible institution has one or more BRTs that are used by employees who have been authorized to perform registrations. Each employee is accountable for each buyer registered.

The BRT consists of:
  an microcomputer and screen, keyboard, mouse
  a BIA/Reg
  a modem or network connection
  a buyer registration software application The BRT uses an attached BIA/Reg for biometric entry, and is connected to the system by a modem or a network connection. Buyer Registration Terminals are located in places that are physically secure such as retail banking outlets.

Three entities need to be identified for the DPC to respond positively to a BIA/Reg registration message: the registering employee, the institution, and the BIA/Reg. The employee must have been authorized to register buyers for that institution.

The institution and the BIA are identified by cross-checking the owner of the BIA with the institution code set by the BRT. The employee identifies himself to the system by entering his biometric-PIN upon starting the registration application.

The institution uses its standard customer identification procedure (signature cards, employee records, personal information, etc.) before registering the buyer on the system. It is important for the institution to verify buyer identity as assiduously as possible, since the registering buyer will be empowered to make purchases and transfer money from those financial accounts at will.

During registration, the buyer enters both a primary and secondary registration biometric sample. The buyer must use both index fingers; if the buyer is missing index fingers, the next inner-most finger may be used. Requiring specific fingers to be used (such as the index finger) allows the prior fraud check to work.

The buyer is encouraged to select a primary and a secondary finger; the primary finger is given preference during the DPC identity check, so the buyer should present the most-often used finger as the primary. Of course, the DPC could choose to alter the designation of primary and secondary biometrics based on operations if it turns out to be important to do so.

As a part of the biometric encoding process, the BIA/R determines if the buyer has entered "a good print." If a good print is not present, the BIA/R asks the buyer to re-enter the biometric which was determined to be of poor quality.

The buyer selects a PIN of from four to twelve digits from a series of PIN options provided by the system's central database. However, the PIN must be validated by the system. This involves two checks: one, that the number of other buyers using the same PIN aren't too great (since the PIN is used to reduce the number of buyers checked by the biometric comparison algorithm), and that the buyer's registration biometric sample being registered isn't too similar to other buyer's biometrics stored within the same PIN group. If either happens, the enrollment is rejected, an error message is returned to the BRT, and the buyer is instructed to request a different PIN. The system may optionally return with an "identical match" error condition, which indicates that the buyer already has a record in the system under that PIN.

A PIN of 0 allows the system to assign a PIN to the buyer.

The buyer constructs a confidential private code consisting of a word or phrase. If the buyer does not wish to construct one, a private code will be constructed randomly by the terminal.

The buyer may also arrange their financial account code list. This list describes which account index code points at which account (e.g. 1 for debit, 2 for credit, 3 for emergency account index code linked to debit, etc.). For checking and savings accounts, the registering institution must be the bank or financial institution that provides the accounts. The buyer signs an agreement allowing the system to authorize financial transactions on their behalf when they present their biometric-PIN.

Even after registration, a buyer is not actually able to perform operations using the system until a prior fraud buyer re-registration check is completed. This generally takes a few minutes, but during times of high load, it takes up to several hours. Only if the system finds no instance of prior fraud is the buyer's access activated.

In an alternate embodiment, relatively low security registrations are accomplished at places such as supermarkets, over the Internet, or at unattended kiosks. Registrations at such places must be subsequently confirmed by a telephone call to the registering buyer using a telephone number gathered from credit or bank account records, or by sending a letter to the registering buyer's mailing address (also gathered from bank or credit account records) requiring him to call back and confirm the registration. The ability to authorize transactions will only be enabled once registration is confirmed.

If a financial account number is registered without the participation of the issuing institution, the financial account owner must sign an agreement at the time of registration authorizing the release of funds whenever a transaction is received by the system that is properly authorized using his biometric and PIN. Of course, confirmation of identity is still required to validate the signature, either through a telephone contact or an in-person examination of the registrant's identity documents. This confirmation is required in order to prevent buyers from registering other people's financial account numbers under their own biometric and PIN.

If a buyer does manage to register another buyer's financial accounts and make use of them for a period of time, once detected, the buyer's ability to authorize transactions will be disabled, and the buyer will be added to the prior fraud database preventing the buyer from re-registering until the matter is cleared up.

If a buyer is found to have defrauded the system, the DPC institutes a database-wide involuntary biometric database search for the buyer. Several of these are performed each night, so buyers who are particularly wanted by the system can thus be winnowed out of the database by using a time consuming process during conditions of light activity.

The employees performing the registration operation identify themselves using biometric-PIN only when initially activating the registration system. This is a convenience for the employee, but a possible security problem for the system, as unattended or "temporarily borrowed" BRTs could be the source for fraud. As a result, the registration application exits after a predetermined period of no activity.

5. Data Processing Center

The preferred embodiment of the Data Processing Center (DPC) is responsible for identification of the user/buyer, electronic steps necessary to effect an identification, or steps to complete a financial transaction such as debiting and crediting a financial account.

Each DPC site is made up of a number of computers and databases connected together over a LAN as illustrated in the DPC Overview FIG. 2. Multiple identical DPC sites ensure reliable service in the face of disaster or serious hardware failure at any single DPC site. Furthermore, each DPC site has electrical power backup and multiple redundancy in all of its critical hardware and database systems.

DPC components fall into three categories: hardware, software, and databases. Below is a short description, by category, of each component. More detailed descriptions appear in the following sections.

Hardware
FW
    Firewall Machine: the entry point of the DPC site.
GM
    Gateway Machine: the system coordinator and message processor.
DPCLAN
    DPC Local Area Network: connects the DPC sites Databases
IBD
    Individual Biometric Database: identifies buyers from their biometric and PIN code.
PFD
    Prior Fraud Database: lists buyers who have defrauded the system and can check if a biometric matches any of these buyers.
VAD
    Valid Apparatus Database: stores information required to validate and decrypt BIA messages.
AOD
    Apparatus Owner Database: stores information about the owners of BIA devices.
AID
    Authorized Individual Database: stores the list of people allowed to use personal or issuer BTA devices.

Software
MPM
   Message Processing Module: handles the processing of each message by coordinating with the other software modules and databases required to perform the message's task.
SNM
   Sequence Number Module: handles DUKPT sequence number processing.
MACM
   Message Authentication Code Module: handles MAC validation and generation.
MDM
   Message Decrypt Module: handles encrypting and decrypting of BIA requests and responses.
PGL
   PIN Group List: handles the lookup of PIN groups by PIN and the configuration of database elements that depend on the list of PIN groups.
IML
   IBD Machine List: handles the lookup of the main and backup database machines dedicated to holding IBD records for a given PIN group.

When defining database schema, the following terminology is used for describing field types:
   int<X> an integral type using <X> bytes of storage
   char<X> a character array of <X> bytes
   text a variable length character array
   <type>[X] a length <X> array of the specified type.
   time a type used for storing time and date
   biometric a binary data type used for storing the biometric When describing database storage requirements, the term "expected" means the expected condition of a fully loaded system.

Terminals accomplish their tasks by sending messages to a DPC site. The DPC site sends back a response packet containing the status on the success or failure of the operation.

Communication is via a logical or a physical connection-oriented message delivery mechanism such as X.25 connections, TCP/IP connections, or a telephone call to a modem bank. Each session holds the connection to the terminal open until the DPC sends its response back to the terminal.

The message contains a BIA message part and a terminal message part:
BIA Message Part
   protocol version number
   message type
   4-byte Bia Identification
   4-byte sequence number
   <message specific data>
   Message Authentication Code (MAC)
Terminal Message Part
   <terminal specific data>

The BIA message part is constructed by a BIA device. It includes one or two biometrics, a PIN, authorization amounts, and the contents of the general registers are set by the terminal. Note: the MAC in the BIA message part only applies to the BIA part and not to the terminal part.

A terminal may place additional data for the message in the terminal message part. The BIA provides a message key to allow the terminal to secure the terminal part data. The BIA automatically includes the message key in the packet's encrypted biometric-PIN block when necessary. The terminal performs the message key encryption itself, however.

The response packet contains a standard header and two optional free-form message parts: one with a MAC and one without:

Standard Header
   protocol version number
   message type
   <message specific data>
   MAC
   Optional Free-form message part without MAC
   <additional message specific data>

The message part with a MAC is sent to the BIA so that it may validate that this part of the response has not been tampered with and to display the buyer's private code. The message part without a MAC is used for transmitting large amounts of data that are not sent to the BIA for MAC validation as the BIA to terminal connection may be of limited bandwidth.

In an embodiment of the invention with multiple DPC sites, a terminal need only send its message to one of the DPC sites, typically the closest, because that site automatically handles updating the others by running distributed transactions as necessary.

When one of the DPC's Firewall Machines receives a packet, it forwards it to one of the GM Machines for the actual processing. Each GM has a Message Processing Module that handles the coordination between the DPC components required to process the message and sends the response back to the sender.

All packets the DPC receives, with the exception of those not constructed by a BIA, contain a BIA hardware identification code (the BIA Identification of the packet), a sequence number, and a Message Authentication Code (MAC). The GM asks the MAC Module to validate the packet's MAC and then checks the sequence number with the Sequence Number Module. If both check out, the GM passes the packet to the Message Decrypt Module for decryption. If any one of the checks fail, the GM logs a warning, terminates processing for the packet, and returns an error message to the BIA device.

Each packet the DPC receives may contain an optional response key stored in the encrypted biometric-PIN block of the packet. Before the DPC replies to a message that includes a response key, it encrypts the response packet with the response key. It also generates a Message Authentication Code and appends it to the packet.

The only exception to encrypting response packets applies to error messages. Errors are never encrypted and never include confidential information. However, most response packets include a status or response code that can indicate whether the request succeeded or not. For example, when the DPC declines a credit authorization, it does not return an error packet, it returns a normal transaction response packet with a response code set to "failed".

DPC Procedures
The DPC has three procedures commonly used while processing messages.

For messages that require the DPC to identify a buyer, the DPC executes the following procedure using the personal authentication information in the message (the bid biometric and the PIN): using the PIN code, the DPC searches the IBD Machine List for the main and backup IBD machines responsible for handling identifications for the given PIN code. Next, the DPC sends the identification message to either the main or backup machines depending on which is the least loaded. The IBD machine responds with the IBD record for the buyer or a "buyer not found" error.

The IBD machine retrieves all the IBD records for the given PIN. Using a proprietary biometric hardware device, the IBD machine compares each record's primary registered biometric sample with the buyer's bid biometric sample arriving at a comparison score indicating the similarity of the two biometrics. If no biometric has a close enough comparison score, the comparisons are repeated using the registered secondary biometric samples. If none of the secondary biometric have a close enough comparison score, then the IBD machine returns an "buyer not found" error. Otherwise, the IBD machine returns the full IBD record of the buyer, from which such fields such as the private code, financial account numbers, and so on may be obtained.

The IBD machine maintains a circular queue of the most recently submitted bid biometric samples for each IBD record. If a bid biometric sample exactly matches a sample on the queue, the DPC can assume that the buyer's biometric sample may have been stolen. If this happens repeatedly, the DPC will suspend the buyer's ability to authorize transactions and generate a security violation message. When contact is made with the buyer, the DPC will allow the buyer to select a new PIN, thus resolving the issue.

For messages that include an account index code, the DPC handles the case where the buyer chooses his or her emergency account index code. The GM processing the message immediately logs a warning, and if the response packet has a response code and the IBD silent alarm procedure code instructs it to forward the silent alarm to the seller, sets the response code to "silent alarm".

Other behavior during a silent alarm is governed by the IBD record's silent alarm code field. This includes forwarding silent alarms to local authorities, rejecting transactions over a particular amount, or rejecting transactions altogether. The DPC also increments the silent alarm use count of the buyer's IBD record whenever the emergency account index code is used.

It is the responsibility of the owner of the BIA device that submitted the message to watch for an "silent alarm" response code and provide further action.

Before each message can be executed, the DPC performs a security factor assessment on the message to determine if the message has a high probability of having been fraudulently generated.

Each entry in the VAD has information on the number of recent messages submitted, the number of recent messages that have failed, the device security assessment, whether or not the device is attended along with the fraud detection skill of the attendant, and lastly the security problems associated with the physical location of the device itself (i.e. low or high crime area, etc.). The local time of day is also added into the equation. If the message is a commercial transaction, the dollar value of the transaction is also applied as a modifier. Other factors can be added as necessary. The result of the calculation is a number indicating the relative confidence that the transaction is legitimate.

Once the security factors assessment is done, transactions that are rated below a particular value are rejected as possible security problems, while transactions that are rated below a second and lower value are rejected as probable violations, the transaction is noted in the DPC security log.

Whenever a buyer identification fails, the VAD record for the device is updated appropriately. In one embodiment, a Security Factor Module will take the device out of service, refusing any further transactions from that device until a service representative places it back in service.

Protocol Messages

The following sections describe an embodiment of each protocol message/response and the actions the DPC takes to perform them. It is understood that various embodiments containing different data and information are possible.

The list of protocol packets are:
   Buyer Identification
   Commercial Transaction
   Registration
   Issuer Batch
   List Accounts Buyer Identification
Buyer Identification Message
BIA Part:
   4-byte BIA Identification
   4-byte sequence number
   encrypted(DUKPT key) Biometric-PIN block:
      300-byte authorization biometric
      4-12 digit PIN
      112-bit response key
   MAC
Terminal Part: (not used)
Buyer Identification Response
   encrypted(response key):
      private code text
      buyer name
      biometric identification code
   status code (ok, failed, etc.)
   MAC The Buyer Identification message includes a biometric-PIN block which the DPC uses together with the buyer identification procedure to identify the buyer. If the buyer is identified, then the DPC responds with the buyer's name, biometric identification, and private code. Otherwise, the DPC responds with an "unknown buyer" error.

Commercial Transaction
Transaction Request Message
BIA Part:
   4-byte BIA Identification
   4-byte sequence number
   encrypted(DUKPT key) Biometric-PIN block:
      300-byte authorization biometric
      4-12 digit PIN
      112-bit response key
      [optional 112-bit message key]
   account index code
   price
   seller identification code
   transaction type
   [optional free-format product information]
   [optional seller identification channel (phone number, channel number+time, hostname)]
   [optional send-address request]
   MAC
Terminal Part: (not used)
Transaction Response Message
   encrypted(response key):
      private code text
   authorization response
   authorization detail (authorization code, transaction identification, etc)
   [optional buyer address information]
   status code (OK or fail, silent alarm)
   MAC There are two basic commercial transaction subtypes: retail and remote.

There are two basic transaction types: debit and draft. Drafts return authorizations that are subsequently cashed by the seller. No money changes hands until the draft is cashed. Most current credit card transactions are done via draft. For instance, a deposit charge placed on a credit card by a car rental agency is done using a draft. In one embodiment, these steps are accomplished using a pair of ISO 8583 messages: an authorization message followed by a transaction request message.

Debit transactions result in immediate transfer of money from the buyer's financial account to the seller's financial account. Note that debit transactions can occur on a number of different kinds of financial accounts, including checking accounts, savings accounts, money market accounts, credit accounts, and even phone calling-card accounts. If money changes hands immediately, the system considers the transaction type to be debit, regardless of the financial account type used as the source of funds, or which external computer system is used to move the money around.

The DPC identifies the buyer by the biometric-PIN block of the message. If the buyer cannot be identified, the DPC replies with an "unknown buyer" error.

At this point, the DPC executes the actual transaction.

For instance, if the transaction type is a draft, the DPC constructs a credit authorization draft request and transmits it to the appropriate external computer system (e.g. VISANet, MAPP, etc.). The external computer system is responsible, in this embodiment, for performing the resource determination to see if the buyer can pay. If the external computer system approves the transaction, the DPC returns an "OK" response code to the BIA device, while a disapproval results in a "failed" code. The contents of the response message from the external computer system (called an "authorization request response", see ISO 8583) are added to the response as well along with the buyer's private code.

In an alternate embodiment, the accounts and their balances are stored at the DPC, which performs resource determination, draft generation or credit/debit instead of sending the transaction to an external computer system.

When the DPC looks up the buyer's financial account using the account index code of the message, the chosen account index code may be the emergency account index code. If this happens, the DPC follows the silent alarm procedure, which may involve performing the transaction as usual, or performing the transaction with modified credit limits, as well as notification of authorities.

Remote authorization are generated by telephone, mail order, the Internet, or cable television sellers. The DPC handles remote authorizations the same way it does a retail authorization but with the following exceptions:

i) Remote authorizations include a remote seller identification code which the DPC checks against the Remote Seller Database to validate whether the packet's seller Identification matches the one stored in the database. Furthermore, the financial account credited is the remote seller's financial account, not the financial account of the BIA device's owner.

ii) Additionally, BIA devices that generate the remote authorizations tend to be personal BIA devices. The DPC checks the biometric Identification of the identified buyer against the Authorized Individual Database's list of buyers allowed to use the BIA device. If the buyer is not authorized to use the device, then the DPC denies the authorization request.

iii) Finally, the authorization packet may contain a "send-address" indicator. This indicator informs the DPC to include the buyer's address in the response packet and is usually used only for mail order purchases.

Registration
Registration Message
BIA Part:
    4-byte BIA Identification
    4-byte sequence number
    encrypted(DUKPT key) Biometric-PIN block:
        1000-byte primary registration biometric
        1000-byte secondary registration biometric
        4-12 digit PIN
        112-bit response key
        112-bit message key
    MAC
Terminal Part:
    encrypted(message key):
        name
        address
        zipcode
        private code
        financial account list (account index code, financial account #)
        emergency account index code, account index code
        silent alarm behavior
Registration Response
    encrypted(response key):
        private code text
        PIN
        biometric identification code
        list of DPC chosen PINs (if original choice of PIN is rejected)
    status code (OK, failed, etc)
    MAC Buyers register with the DPC via a Buyer Registration Terminal (BRT). The BRT sends the DPC a registration packet containing primary and secondary biometric and personal identification number, along with ancillary data such as the buyer's name, address, a list of financial accounts, the private code, and the emergency account index code. Optionally, the buyer may include a Social Security Number (or "SSN"). The buyer may choose his or her own PIN code or allow the system to choose it. In a modification step any previously entered data can be modified or deleted.

At any given moment, only one DPC site acts as the registration site, for implementation simplicity. Registration messages received by non-registration DPC sites are forwarded to the current registration site. The registration DPC site performs the entire registration check, assigning of IBD records to IBD machines, and the distributed transaction required to update all other DPC sites.

The registration DPC site selects the PIN code for registration messages that don't specify one, stores the IBD record on the main and backup IBD machines (as specified in the PIN Group List), and checks the PIN and biometric suitability of the registration packet before running the distributed transaction to update the other DPC sites.

The DPC runs a personal identification number and biometric sample duplication check step wherein the biometric and personal identification number gathered during the registration step is checked against all previously registered biometrics currently associated with the identical personal identification number. The DPC may reject the registration for the following reasons: the PIN code is too popular, or the biometrics are too similar to other biometrics stored under the chosen PIN. To aid the buyer in choosing an acceptable PIN, the DPC generates a short list of PIN codes for which the registration will be guaranteed that it reserves for a period of time. The BRT then prompts the buyer for a new PIN which may be chosen from the good PIN list.

Firewall Machine

The FW Machines provide a first line of defense against network viruses and computer hackers. All communication links into or out of the DPC site first pass through a secure FW Machine.

The FW Machine, an Internet-localnet router, only handles messages destined for the GM Machines.

BIA-equipped terminals send packets to a single DPC site via modem, X.25, or other communication medium. The DPC relies on a third party to supply the modem banks required to handle the volume of calls and feed the data onto the DPC backbone.

For DPC to DPC communication, primarily for distributed transactions and sequence number updates, the FW Machines send out double-length DES encrypted packets. The DPC LAN component handles the encryption and decryption: the FWs do not have the ability to decrypt the packets.

A properly configured network sniffer acts as an intruder detector as backup for the FW. If an anomalous message is detected, the intruding messages are recorded in their entirety, an operator is alerted, and the FW is physically shut down by the sniffer.

The FW disallows any transmissions from the internal network to the rest of the Internet.

A transaction request message requires about 400 bytes and registration packets require about 2 KB. To handle 1000 commercial transactions per second and 1 registration packet per second, the FW Machines are able to process about 400 KB per second.

Each DPC site has an aggregate bandwidth of nearly three T1 connections to the third party modem bank and the other DPC sites.

Gateway Machine

The GM Machine (GM), through the FW Machines, link the outside world (BIA-equipped terminals and other DPCs) to the internal components of the DPC. The DPC has multiple GMs, typically two.

The GM supervises the processing of each BIA message, communicates with the various DPC components as necessary, and sends the encrypted results of the message back to the sender. The software performing this task is called the Message Processing Module.

The GM logs all messages it receives and any warnings from components it communicates with. For example, the GM logs any silent alarms, sequence number gaps, and invalid packets.

Processing a transaction request message may require the GM to inform GMs at all other DPCs of a change in the DPC databases. When this happens, the GM runs a distributed transaction to update the remote databases.

Distributed transactions fall into two categories: synchronous and asynchronous. Synchronous distributed transactions require the GM to wait for the distributed transaction to commit before continuing to process the packet. Asynchronous distributed transactions do not require the GM to wait for the commit, and allow it to finish processing the message regardless of whether the distributed transaction commits or not. Asynchronous distributed transactions are only used to update data for which database consistency is not an absolute requirement: sequence numbers and biometric checksum recordings may be performed asynchronously, whereas creating database records, such as Buyer Biometric records, may not.

When executing a synchronous distributed transaction, the requesting GM only considers the entire transaction successful if all sites can successfully commit the transaction locally. Otherwise, the GMs back out the changes locally and reject the request due to a transaction error.

The list of valid DPC sites is normally all of the sites. In the case of an extreme site failure, however, a system administrator may manually remove that site from the valid site list. The most likely cause of distributed transaction failures, however, are temporary network failures that are unrelated to any DPC equipment. Messages that require a synchronous distributed transaction cannot be performed until network connectivity is restored or the site is removed from the valid site list. Before a site can be added back to the valid site list, the system administrator brings the site's databases up to date with those of a currently active site.

Software Components

Each GM runs the following software components locally for performance reasons:
Message Processing Module
Message Authentication Code Module
Message Decrypt Module
Individual Biometric Database Machine List The message bandwidth required by the GMs is similar to that required by the FW Machines. A FDDI network interface provides 100 MBits per second and easily covers any bandwidth requirements.

DPC LAN

The DPC Local Area Network (LAN) links the machines of the DPC sites together using a fiber optic token ring. The fiber optic token ring provides both high bandwidth and good physical security.

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

Message Processing Module

The Message Processing Module (MPM) handles the processing for a message. It communicates with other components of the DPC as necessary to perform its tasks. The presence of an MPM on a machine brands it as a GM.

The MPM maintains a message context for each message it is currently processing. The message context includes the information necessary to maintain the network connection to the terminal making the message, the BIA device information, the response key, and the response packet.

Message Authentication Code Module

The Message Authentication Code Module's (MACM) tasks are to validate the Message Authentication Code on inbound packets and to add a Message Authentication Code to outbound packets.

The MACM maintains an in-memory hash table of 112-bit MAC encryption keys keyed by BIA hardware identification code.

When the MACM receives a request from the GM to validate a packet's MAC, it first looks up the packet's hardware identification code in the hash table. If no entry exists, then the MACM replies to the GM with an "invalid hardware identification code" error.

Otherwise, the MACM performs a MAC check on the BIA message part of the packet using the 112-bit MAC encryption key. If the MAC check fails, then the MACM replies to the GM with an "invalid MAC" error. Otherwise, the MACM replies with a "valid MAC" message.

If the packet contains a seller identification code, the MACM also checks the seller identification code against the owner identification code in the hash table. If the codes don't match, then the MACM replies with an "invalid owner" error.

When the MACM receives a request from the GM to generate a MAC for a packet, it looks up the MAC encryption key using the packet's hardware identification code. With the MAC encryption key, the MACM generates a MAC and adds it to the packet. If the MACM cannot find the hardware identification code in its hash table, it replies with an invalid hardware identification code error instead.

Database Schema
The MACM hash table entry contains:
MACM Entry:
   hardwareId=int4
   ownerId=int4
   macEncryptionKey=int16
The table is hashed by hardware identification code.

Assuming 5 million BIA-equipped devices in service, the hash table requires about 120 MB of storage. For performance reasons, this hash table is cached completely in memory.

The MACM only contains records referencing active BIA hardware identification codes and active apparatus owners. Whenever an apparatus or apparatus owner is suspended or deleted from the system, the MACM removes any entries that reference the identification code. When an apparatus is activated, the MACM then adds an entry for it.

The MACM also caches the MAC encryption key from the Valid Apparatus Database. Since the system does not allow the encryption key of a BIA to be changed, the MACM does not need to worry about receiving encryption key updates.

Message Decrypt Module
The Message Decrypt Module's (MDM) task is to reconstruct the DUKPT transaction key and with it decrypt the biometric-PIN block of the packet. It maintains a list of the DUKPT Base Keys that are required to generate the transaction key.

The MDM constructs the DUKPT transaction key using the packet's sequence number as the DUKPT transaction counter, the upper 22 bits of the BIA hardware identification code as the DUKPT tamper resistant security module (or "TRSM") Identification, and the low 10 bits of the BTA hardware identification code as the DUKPT Key Set Identification.

The DUKPT standard specifies how the transaction key is generated. The Key Set Identification is used to look up a Base Key from the Base Key List. The Base Key is used to transform the TRSM Identification into the initial key via a DES encrypt/decrypt/encrypt cycle. The transaction counter is then applied to the initial key as a series of DES encrypt/decrypt/encrypt cycles to generate the transaction key.

For additional security, two Base Key Lists are maintained, one for low security BIA devices and one for high security devices. The MDM chooses which Base Key List to use depending on the security level of the device.

Database Schema
The MDM Base Key List entry contains:
MDM Entry:
   baseKey=int16
The Base Key List is indexed by Key Set Identification.

The MDM maintains an in-memory list of the DUKPT Base Keys. Each key requires 112-bits. The MDM maintains two sets of 1024 keys requiring 32 KB total.

The MDM has no direct dependencies on any other DPC component.

PIN Group List
The PIN Group List (PGL), in conjunction with the Individual Biometric Database Machine List, defines the configuration of the IBD machines. The PGL stores a list of the PIN groups in the system which is used to simplify the management of the PINs. A PIN group is a set of consecutive PIN codes. A PGL exists on each GM Machine (GM).

The PGL, when given a PIN code, searches through its list of PIN groups for the group containing the PIN code. The PGL maintains the list of groups in order and uses a binary search to quickly find the correct group.

The initial configuration for the PGL is one giant PIN group containing all possible PINs. After a threshold number of PINs are assigned, the giant PIN group is split in two. Thereafter, this process is applied to all succeeding PIN groups.

When a PIN group splits, the PGL assigns a new main and backup IBD machine based on available storage on a first-come-first serve basis. The PGL coordinates with the IBD machines to first copy the affected records from the old main and backup machines to the new ones, update the IML record, and last remove the old main and backup copies. Splitting a PIN group is an involved task. The PGL batches split requests to be run when the DPC is lightly loaded, for instance, at night.

The system administrator may also change the main and backup IBD machines for a given PIN group if the machines' free storage falls below a level required for handling the expected amount of new registrations.

Database Schema
The schema for the PIN Group records are:
PINGroup:
   lowPin=int8
   highPin=int8
   used=int4
Each PIN group is identified by a unique identifier. For convenience the PIN group identification code is the lowPin code for the group, however the system does not otherwise rely upon this fact.

The PGL is keyed by the lowPin field.

The PGL is expected to contain about 3000 groups (each PIN group contains about 1000 active PINs, but may span millions of actual PINs). The entire PGL requires about 72 KB of storage and is cached completely in memory.

When PIN groups are added, merged, or split up, the PGL is responsible for informing the IBD Machine List of the changes and for directing the movement of IBD records from one IBD machine to another.

Individual Biometric Database Machine List
The IBD Machine List (IML), in conjunction with the PIN Group List, codifies the configuration of the IBD machines. The IML maps a PIN code to the main and backup IBD machines storing IBD records for the PIN. The IML is actually keyed by PIN Group (a set of consecutive PIN codes) rather than by buyer PINs because this greatly reduces the memory required to store the list. An IML exists on each GM Machine (GM).

When a GM processes a message that requires a biometric identification, the GM finds the IML record keyed by the biometric PIN group. The GM then knows the main and backup IBD machines to use for the biometric identification.

Most IBD records will be buyers, who will use the system to purchase products from sellers at points of sale. The rest of the records will be generally associated with people who perform administrative functions such as registration, or customer support.

Database Schema
The schema for the IML list entries are:
MachinePair:
pinGroup=int8
main=int2,
backup=int2
The IML is keyed by pinGroup.

The IML is expected to contain about 3000 entries (the number of PIN Groups). Each MachinePair record is 12 bytes requiring about 36 KB of storage and is cached completely in memory.

Any changes in the configuration of the IBD machines are reflected in the IML. In addition, the IML uses PIN groups for its keys so when the PIN Group List gets modified, the IML is also updated.

Sequence Number Module

The Sequence Number Module's (SNM) primary function is to prevent replay attacks by validating packet sequence numbers. Its secondary task is to minimize the effects of a resubmission attack by informing other SNMs in remote DPC sites of sequence number updates and to periodically update the sequence numbers in the Valid Apparatus Database.

The SNM maintains an in-memory hash table of sequence numbers keyed by BIA hardware identification code codes to allow quick validation of packet sequence numbers.

When the SNM receives a validate request from the GM for a given hardware identification code and sequence number, it looks up the hardware identification code in the hash table. If no entry exists, then the SNM replies to the GM with an "invalid hardware identification code" error.

Otherwise, the SNM checks the given sequence number against the sequence number stored in the hash table entry. If the sequence number is less than or equal to the stored sequence number, the SNM replies with an "invalid sequence number" error. Otherwise, the SNM sets the sequence number in the hash table entry to the given sequence number and replies with a "valid sequence number" message.

From time to time, the SNM may observe a sequence number gap. A sequence number gap occurs when the SNM receives a sequence number that is more than one greater than the sequence number stored in the hash table entry. In other words, a sequence number was skipped. When the SNM discovers a sequence number gap, it replies with a "sequence number gap" message to the GM instead of a "valid sequence number" message. The GM treats the packet as valid, but it also logs a "sequence number gap" warning.

Sequence number gaps usually occur when network connectivity is lost: packets are dropped or can't be sent until the network is restored to working order. However, sequence number gaps occur for fraudulent reasons as well: malicious parties could intercept packets preventing them from arriving at the DPC or they could even attempt to counterfeit packets (with a large sequence number so that it isn't immediately rejected).

The SNM's secondary function is to inform other DPCs of the updated sequence numbers. Quickly updating sequence numbers at all DPC sites thwarts resubmission attacks wherein a malicious entity monitors packets destined for one DPC site and immediately sends a copy to a different DPC site in the hope of exploiting the transmission delay of sequence number updates from one DPC site to another resulting in both sites accepting the packet as valid, when only the first site should accept the packet.

The SNMs send update messages to each other whenever they receive a valid sequence number. If an SNM receives an update message for a sequence number that is less than or equal to the sequence number currently stored in its hash table, that SNM logs a sequence number resubmission warning. All resubmission attacks are detected in this manner.

A simpler way to thwart resubmission attacks completely, is to have only one SNM validate packets. Under this scheme, there is no update transmission delay window to exploit with a resubmission attack. Alternately, multiple SNMs can be active at the same time provided none of them handle sequence number validation for the same BIA-equipped device.

Sequence Number Maintenance

When the SNM boots up, it loads the sequence number hash table from the sequence numbers for active BIA stored in the VAD.

Once per day, the SNM downloads the current sequence numbers to the local Valid Apparatus Database (VAD).

The VAD is responsible for sending add-entry and remove-entry messages to the SNMs for any BIA-equipped devices that are activated or deactivated to keep the SNM hash table up-to-date.

Database Schema
The SNM hash table entry contains:
SNM Entry:
hardwareId=int4
sequenceNumber=int4
The hash table is keyed by hardwareId.

Assuming about 5 million BIA-equipped devices in service requires the hash table to be about 40 MB.

The SNM depends on the Valid Apparatus Database. When an apparatus is suspended or removed from the database, the SNM removes the corresponding entry. When an apparatus is activated, the SNM creates an entry for it.

The SNMs require a transmission bandwidth of about 8 KB per second to handle 1000 update sequence number messages per second. The update sequence number messages is buffered and sent out once per second to minimize the number of actual messages sent.

Apparatus Owner Database

The Apparatus Owner Database (AOD) stores information on buyers or organizations that own one or more BIA-equipped devices. This information is used to double check that the BIA devices are used only by their rightful owners, to provide financial account information for financial credit and debit transactions, and to allow identification of all BIAs owned by a specific buyer or organization.

Most BIA devices will be owned by sellers, i.e. sellers engaged in selling to buyers wishing to buy products.

Each AOD record includes a financial account to credit or debit the owner when the DPC processes a financial transaction submitted by one of the owner's BIA-equipped devices. For instance, transactions submitted from BIA attached to a retail point of sale terminal involves credits to the owner's financial account.

Database Schema
The schema for the Apparatus Owner record is:
ApparatusOwner:
ownerId=int4
name=char50

```
address=char50
zipCode=char9
financialAccount=char16
status=int1
The status field is one of:
0: suspended
1: active
```

The Apparatus Owner Database is keyed by ownerId.

The AOD is expected to store about 2 million Apparatus Owner records. Each entry is 130 bytes requiring about 260 MB of storage. The AOD is stored as a hashed file keyed by owner identification code. A copy of the AOD is stored on each GM.

When entries are removed or suspended from the AOD, any Valid Apparatus Database records that reference those apparatus owners are marked as suspended. In addition, the MAC Module and the Sequence Number Module remove their entries for the suspended apparatuses.

Valid Apparatus Database

The Valid Apparatus Database (VAD) is a collection of records representing all of the BIAs that have been manufactured to date. The VAD record contains the Message Authentication Code encryption key for each BIA, as well as an indication of whether a BIA is active, awaiting shipment, or marked as destroyed. In order for a message from a BIA to be decrypted, the BIA must exist and have an active record in the VAD.

When manufactured, each BIA has a unique public identification code. In addition, each BIA is injected with a unique MAC encryption key, and an initial DUKPT key, all of which are entered into the VAD record prior to BIA deployment.

When a BIA is first constructed, it is given a unique hardware identification code. When a BIA is placed in service, its hardware identification code is registered with the system. First, the owner or responsible party of the BIA is entered into the Apparatus Owner Database (AOD). Then, the VAD record is pointed to the AOD record, and the BIA is then set active. Messages from that BIA are accepted by the DPC.

When a BIA enters service, the installing agent performs an attendant security assessment, determining the relative attentiveness the organization pays towards fraud-fighting and the like. Likewise, the geography of the surrounding area is examined; high crime neighborhoods will merit a lower security value, for instance. These values are place in the VAD record for the device. These can change over time.

When a BIA is removed from service, it is marked as inactive, and the link to the AOD record is broken. No communications from that BIA are accepted.

Each BIA type and model has a device security assessment performed on it during its design and construction. This represents the basic ability of the device to resist attempts to monitor the BIA's internal functioning, the ability of the BIA to keep both past and current encryption keys stored on the BIA secret, and the BIA's ability to resist reprogramming by criminals.

The number of failed messages, recent messages, and the average number of messages performed by a given apparatus are recorded in the VAD record, to assist the security factors module in detecting fraudulent messages. Periodically, the recentReqs and the failedReqs fields are cleared.

Database Schema

The schema for the Valid Apparatus record is:
```
Valid Apparatus:
    hardwareId=int4
    macEncryptionKey=int16
    ownerId=int8
    mfgDate=time
    inServiceDate=time
    deviceSecurity=int2
    locationSecurity=int2
    attendentSkill=int2
    failedReqs=int2
    recentReqs=int2
    avgreqs=int2
    status=int1
    type=int1
    use=int1
Possible values for the status field are:
    0: suspended
    1: active
    2: destroyed
Possible values for the type field are (one for each type of
    terminal):
    0: BRT
    1: CPT
    2: CST
    3: IPT
    4: IT
    5: PPT
    6: RPT
Possible values for the use field are:
    0: retail
    1: personal
    2: issuer
    3: remote
```

The Valid Apparatus Database is keyed by hardware identification code.

The VAD handles about 5 million retail, issuer, and remote Valid Apparatus entries. Each entry is 51 bytes requiring about 255 MB total. The VAD is stored as a hashed file keyed by hardware identification code. A copy of the VAD is stored on each GM.

The number of personal Valid Apparatus entries number in the range of 30 million requiring an additional 1.5 GB of storage.

When a VAD record changes status, the MAC Modules and Sequence Number Modules are informed of its change in status. For instance, when an apparatus becomes active, the MACP and SNM adds an entry for the newly active apparatus. When an apparatus becomes inactive, the MACP and SNM remove their entry for the apparatus.

Individual Biometric Database

Individual Biometric Database (IBD) records store personal information on buyers for both identification as well as authentication. This information includes their primary and secondary biometrics, one or more PIN codes, a list of financial accounts, account index codes, account index names, private code, one or more emergency account index codes, address, and phone number. The buyer may optionally include this SSN. This information is necessary for identifying a buyer either by biometric or personal information, for accessing related information, or for providing an address or phone number to remote sellers for additional verification.

Buyers are added to the system during the buyer enrollment process at registered Buyer Registration Terminals located in retail banking establishments worldwide, or in local system offices. During enrollment, buyers select their personal identification numbers, and add financial accounts to their biometric and PIN combination.

Buyers may be removed from the database due to fraudulent activity reported by any issuing member. If this occurs, the buyer's record is moved from the IBD to the Prior Fraud Database (PFD) by an authorized internal systems representative. The biometric Ids for records in the PFD may not be used for records in the IBD.

The IBD exists on multiple machines, each of which is responsible for a subset of the IBD records with a copy of each record stored on two different machines, both for redundancy and for load-sharing. The IBD Machine List, stored on the GM, maintains which machines hold which PINs.

Database Schema

The schema for the Buyer Biometric record is:
BuyerBiometric:
    primaryBiometric=biometric
    secondaryBiometric=biometric
    biometricId=int4
    PIN=char10
    phoneNumber=char12
    lastName=char24
    firstName=char24
    middleInitial=char2
    SSN=char9
    privateCode=char40
    address=char50
    zipCode=char9
    publicKey=char64
    checksums=int4[100]
    accountIndexCodes=char30[10]
    accountIndexNames=char30[10]
    emergencyIndexCode=char1
    emergencyLink=char1
    privs=char10
    enroller=int8
    silentAlarmCount=int4
    silentAlarmBehavior=int2
    status=int1

The status field is one of:
    0: suspended
    1: active
    2: priorFraud

The IBD is keyed by PIN.

The silent alarm behavior is a list of mutually non-exclusive options, including "notify authorities", "reject attended transaction", "reject unattended transaction", "$150 transaction limit", or "present false private code."

Each IBD machine has additional indexes on the buyer's Social Security Number, biometric identification code, last name, first name, and phone number to facilitate access to the IBD database.

Each IBD machine has 40 GB of secondary storage provided by one or more RAID devices. Each IBD record is 2658 bytes (assuming the biometrics are 1K apiece) allowing up to 15 million records per machine. The IBD records are stored using a (perhaps clustered) secondary index on the PIN. The index is stored in memory and requires no more than 64 MB (a 64 MB index handles about 16 million entries). To store records for 300 million buyers, the DPC needs at least 40 IBD machines: 20 IBD machines for main storage and another 20 for backup. The number of IBD machines is easily scaled up or down depending on the number of registered buyers.

The IBD machines, PIN Group List, and the IBD Machine List remain up-to-date in terms of which PINs are on which machine. When a PIN group is reconfigured or main and backup machines for PIN groups are changed, the IBD machines update their databases and indexes appropriately.

Authorized Individual Database

For each issuer or personal BIA-equipped device, the Authorized Individual Database (AID) maintains a list of buyers who are authorized, by the owner of the device, to use it.

The AID exists for two reasons. The first is that it provides restricted access to a terminal. For example, the Issuer Terminal can only be used by an authorized bank representative. The second reason for the AID is to prevent criminals from secretly replacing the BIA in a retail point of sale terminal with that of a personal BIA from a phone Terminal and thus routing all purchases to a remote seller financial account set up by the criminals.

Database Schema

The schema for the Authorized Individual record is:
Authorized Individual:
    hardwareId=int4
    biometricId=int4

The hardwareId refers to a record in the Valid Apparatus Database and the biometricId refers to a record in the Individual Biometric Database. Whenever the DPC needs to check whether an individual is authorized to use a personal or issuer BIA device, the DPC checks for the existence of an Authorized Individual record with the correct hardwareId and biometricId.

Personal BIA devices are identified by a use field set to 1 (personal) in the Valid Apparatus Database. Issuer BIA devices are identified by a use field set to 2 (issuer) in the Valid Apparatus Database.

Assuming each issuer terminal has 10 individuals authorized to use it and an each personal device has two authorized individuals with 1,000,000 personal devices in the server, the AID stores about:

$$10*100{,}000+2*1{,}000{,}000=3{,}000{,}000 \text{ entries}$$

The entire database requires about 24 MB of storage.

When Authorized Owner Database records or Valid Apparatus Database records are removed, all Authorized Individual records referencing them are removed.

Prior Fraud Database

The Prior Fraud Database (PFD) is a collection of records representing buyers who have defrauded member issuers at some point in the past. This database allows the DPC to perform a re-registration check on every new registrant quickly, since only a small number of buyers will be designated as having defrauded member issuers. The PFD also runs background transactions during periods of low system activity to weed out buyers in the IBD who have matching records in the PFD.

The system does not automatically put buyers in the PFD, unless it detects that they are attempting to register again. Placing a buyer in the PFD is a sensitive policy matter which is outside the scope of this document.

Before a new IBD record is marked as active, the buyer's primary and secondary biometrics are checked against each and every biometric in the PFD using the same biometric comparison techniques as those used in the buyer identification procedure. If a match is found for the new IBD record, the IBD record's status is designated with a label of "prior fraud", and the GM logs a "registering buyer with prior fraud" warning.

It is assumed that the PFD will remain relatively small. The cost to run the PFD is expensive, as it is an involuntary biometric search, so it is important to add only those buyers to the PFD who have imposed a significant cost to the system.

Database Schema
The schema for the Prior Fraud record is:
Prior Fraud:
    primaryBiometric=biometric
    secondaryBiometric=biometric
    biometricId=int4
    PIN=char10
    phoneNumber=char12
    lastName=char24
    firstName=char24
    middleInitial=char2
    SSN=char9
    privateCode=char40
    address=char50
    zipCode=char9
    publicKey=char64
    checksums=int4[10]
    accountlinks=char30[10]
    emergencyIndex=char1
    emergencyLink=char1
    privs=char10
    enroller=int8
    emergencyUseCount=int4
    status=int1
The status field is one of:
    0: suspended
    1: active
    2: prior fraud
The PFD is keyed by biometric identification code.

The PFD record is the same as the IBD record. Fortunately, the DPC needs to store a lot less of them so only two database machines are required to store the entire database, of which one is the backup.

The PFD does not have any direct dependencies on any other DPC component.

Remote Seller Database

The Remote Seller Database (RSD) stores information on sellers that provide goods or services over telephones, cable television networks, or the Internet. Each order sent by a buyer using a properly-equipped terminal is routed through the seller's order terminal to the system.

Once a buyer's remote commercial transaction is received and the MAC validated by the DPC, the seller identification code is compared against the seller identification code in the RSD. The seller identification code, be it phone number, seller-product credential, or Internet address, exists in the RSD record under the correct seller identification code or the DPC terminates the message and returns an invalid seller identification code error to the sending BIA terminal device.

Database Schema
The schema for the Remote Seller record is:
Remote Seller:
    sellerId=int4
    sellerCode=char16
    sellerType=int1
    publicKey=int16
The Remote Seller sellerType is one of:
    0: telephone
    1: CATV
    2: Internet
The sellerId and sellerCode are both primary keys. No two RSD records have the same sellerId and sellerCode combination.

Assuming about 100,000 remote sellers, the RSD requires about 24 bytes per record for a total of about 2.4 MB storage required.

The RSD does not have any direct dependencies on any other DPC components.

Terminal Protocol Flowchart

The following set of protocol flows describe interactions between specific terminals, the DPC, the attached BIA, and other parties such as the credit/debit processor, and so on. Embodiments of various Terminal Protocol Flowcharts are incorporate herein by reference from U.S. Pat. No. 5,613,012 to applicant.

From the foregoing, it will be appreciated how the objects and features of the invention are met.

First, the invention provides a computer identification system that eliminates the need for a user to possess and present a physical object, such as a token, in order to authorize a transaction.

Second, the invention provides a computer identification system that is capable of verifying a user's identity, as opposed to verifying possession of proprietary objects and information.

Third, the invention verifies the user's identity based upon one or more unique characteristics physically personal to the user.

Fourth, the invention provides an identification system that is practical, convenient, and easy use.

Fifth, the invention provides a system of secured access to a computer system that is highly resistant to fraudulent transaction authorization attempts by non-authorized users.

Sixth, the invention provides a computer identification system that enables a user to notify authorities that a particular access request is being coerced by a third party without giving notice to the third party of the notification.

Although the invention has been described with respect to a particular tokenless identification system and method for its use, it will be appreciated that various modifications of the apparatus and method are possible without departing from the invention, which is defined by the claims set forth below.

The invention claimed is:

1. An identification system comprising:
    a database to store a set of registration biometric samples, the registration biometric samples provided by at least two registered individuals;
    a network component to receive a biometric data from an individual over a communication link and output data associated with the individual over the communication link; and
    a comparator component to compare the biometric data from the individual with at least one registration biometric sample in a subset of the registration biometric samples stored in the database to locate the data associated with the individual, the subset of the registration biometric samples including registration biometric samples from at least two individuals,
    wherein the identification system is designed to operate without the individual presenting any smartcards or magnetic swipe cards.

2. The identification system of claim 1, wherein the network component is operable to receive a personal identification code from the individual over the communication link.

3. The identification system of claim 2, wherein the comparator component is operable to compare the biometric data from the individual with a subset of the registration biometric samples associated with the personal identification code from the individual to determine the identity of the individual.

4. The identification system of claim 1, wherein the network component is operable to receive a registration biometric sample for the individual and store the registration biometric sample in the database.

5. The identification system of claim 4, wherein the network component is operable to receive with the registration biometric sample for the individual a registration personal identification code for the individual and to associate the registration biometric sample with the registration personal identification code in the database.

6. The identification system of claim 5, wherein the network component is operable to receive the personal identification code from the individual over the communication link, and locate the set of registration biometric samples associated with the personal identification code.

7. The identification system of claim 1, wherein the network component is operative to output an identity of the individual over the communication link.

8. The identification system of claim 1, wherein the comparator is operative to compare the biometric data from the individual with a second registration biometric sample in the subset of the registration biometric samples stored in the database if the biometric data from the individual does not match the at least one registration biometric sample.

9. The identification system of claim 1, wherein the data associated with the individual includes a financial account associated with the individual.

10. An identification system comprising:
    a database to store a set of registration biometric samples, the registration biometric samples provided by at least two registered individuals;
    a network component to receive a biometric data from an individual over a communication link and output data associated with the individual over the communication link; and
    a comparator component to compare the biometric data from the individual with a subset of the registration biometric samples stored in the database to locate the data associated with the individual, the subset of the registration biometric samples including registration biometric samples from at least two individuals,
    wherein the identification system is designed to operate without the individual presenting any smartcards or magnetic swipe cards.

11. The identification system of claim 10, wherein the network component is operable to receive a personal identification code from the individual over the communication link.

12. The identification system of claim 11, wherein the comparator component is operable to compare the biometric data from the individual with a subset of the registration biometric samples associated with the personal identification code from the individual to determine the identity of the individual.

13. The identification system of claim 10, wherein the network component is operable to receive a registration biometric sample for the individual and store the registration biometric sample in the database.

14. The identification system of claim 13, wherein the network component is operable to receive with the registration biometric sample for the individual a registration personal identification code for the individual and to associate the registration biometric sample with the registration personal identification code in the database.

15. The identification system of claim 10, wherein the comparator is operative to compare the biometric data from the individual with a second registration biometric sample in the subset of the registration biometric samples stored in the database if the biometric data from the individual does not match the a first registration biometric sample.

16. The identification system of claim 10, wherein the data associated with the individual includes a financial account associated with the individual.

* * * * *

UNITED STATES PATENT AND TRADEMARK OFFICE
CERTIFICATE OF CORRECTION

PATENT NO. : 7,558,407 B2  
APPLICATION NO. : 11/763334  
DATED : July 7, 2009  
INVENTOR(S) : Ned Hoffman et al.

Page 1 of 1

It is certified that error appears in the above-identified patent and that said Letters Patent is hereby corrected as shown below:

Column 18, line 67, the word "BTA" should read -- BIA --;
Column 19, line 48, the word "Bia" should read -- BIA --;
Column 27, line 48, the word "BTA" should read -- BIA --;
Column 31, line 66, the word "hardwareld" should read -- hardwareId --;
Column 32, line 3, the words "in ServiceDate" should read -- inServiceDate --;
Column 32, line 9, the word "avgreqs" should read -- avgReqs --;
Column 33, line 16, the word "biometricld" should read -- biometricId --;
Column 33, line 27, the word "int4[100]" should read -- int4[10] --;
Column 35, line 18, the word "accountlinks" should read -- accountLinks --.

Signed and Sealed this

Third Day of November, 2009

David J. Kappos
*Director of the United States Patent and Trademark Office*